(12) United States Patent
Imai et al.

(10) Patent No.: US 9,733,548 B2
(45) Date of Patent: Aug. 15, 2017

(54) FOCAL-PLANE SHUTTER AND IMAGE CAPTURING APPARATUS

(71) Applicant: CANON KABUSHIKI KAISHA, Tokyo (JP)

(72) Inventors: Rentaro Imai, Yokohama (JP); Toru Kawashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/093,248

(22) Filed: Apr. 7, 2016

(65) Prior Publication Data

US 2016/0299407 A1 Oct. 13, 2016

(30) Foreign Application Priority Data

Apr. 9, 2015 (JP) .................................. 2015-079956

(51) Int. Cl.
*G03B 7/00* (2014.01)
*G03B 9/08* (2006.01)
*G03B 9/42* (2006.01)

(52) U.S. Cl.
CPC ..................................... *G03B 9/42* (2013.01)

(58) Field of Classification Search
CPC .............. G03B 9/42; G03B 9/08; G03B 9/58
See application file for complete search history.

(56) References Cited

U.S. PATENT DOCUMENTS

| 4,466,723 A | * | 8/1984 | Ikari | ......................... | G03B 9/22 |
| | | | | | 396/132 |
| 2003/0118337 A1 | * | 6/2003 | Mikami | ................. | G03B 7/085 |
| | | | | | 396/170 |
| 2006/0045496 A1 | * | 3/2006 | Masuda | ................. | G03B 7/003 |
| | | | | | 396/6 |

FOREIGN PATENT DOCUMENTS

JP 4334092 B 7/2009

* cited by examiner

*Primary Examiner* — Dennis Hogue
*Assistant Examiner* — John H Morehead, III
(74) *Attorney, Agent, or Firm* — Cowan, Liebowitz & Latman, P.C.

(57) ABSTRACT

The focal-plane shutter includes a blade drive member, an acceleration member providing a driving force to the drive member, and a lock member reducing bounce of the drive member after blade movement completion and being movable between a first position where a stopper portion thereof enters a movable area of a contact portion of the drive member and a second position where the stopper portion is located outside the movable area. During the blade movement, the contact portion pushes the lock member to move it from the first to second position. Before the blade movement completion, the contact portion is away from the lock member and thereby the lock member is moved from the second to first position by a biasing force. After the completion, the acceleration member pushes the lock member to move it from the first to second position.

9 Claims, 22 Drawing Sheets

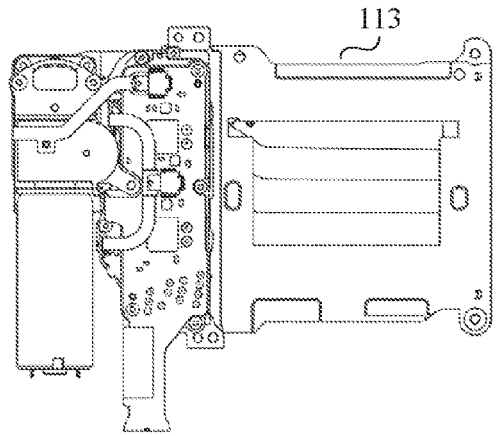
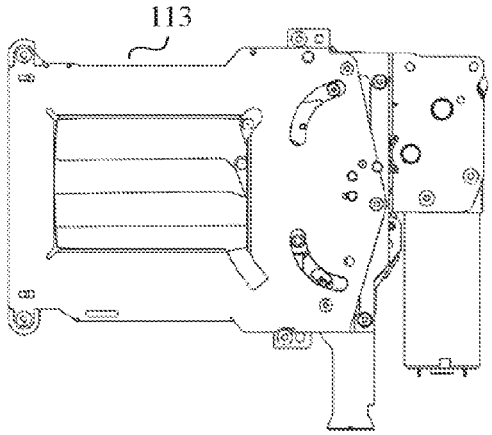
FIG. 1A    FIG. 1B
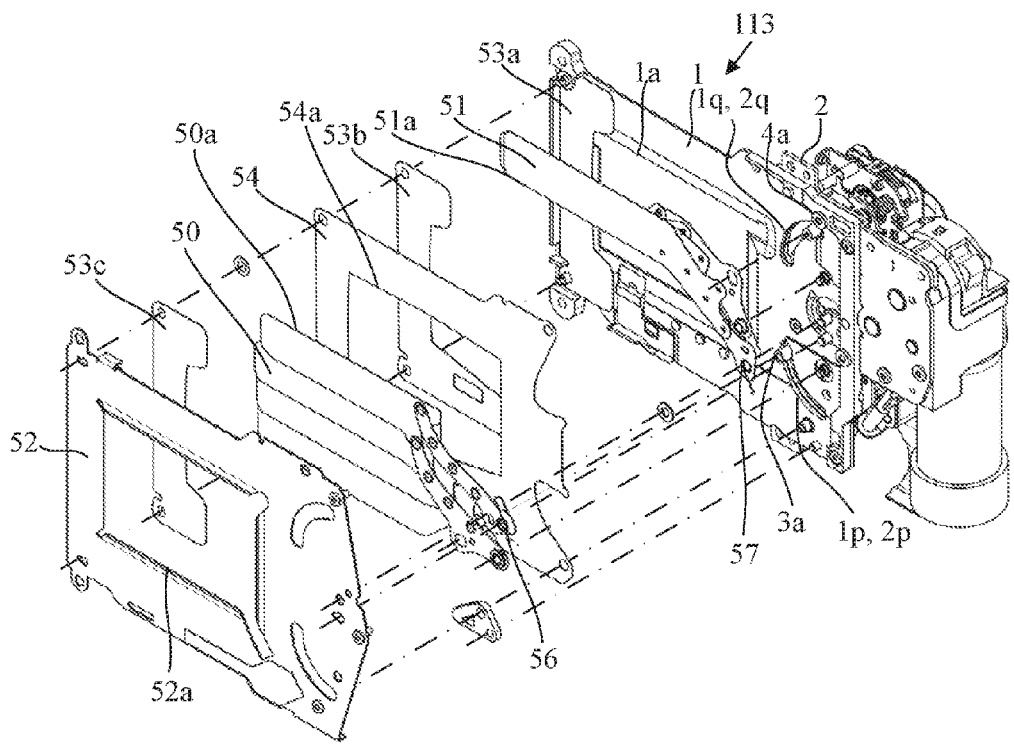
FIG. 1C

POSITION AT COMPLETION OF ROTATION (MOVEMENT)

FOCAL-PLANE SHUTTER AND IMAGE CAPTURING APPARATUS

BACKGROUND OF THE INVENTION

Field of the Invention

The present invention relates to a focal-plane shutter used for image capturing apparatuses such as digital cameras.

Description of the Related Art

Focal-plane shutters used for cameras includes two blade groups (a leading curtain and a trailing curtain) each connected to a blade drive member and moved by the blade drive member rotated by a driving force so as to open or shut an aperture.

In such shutters, after the movement of the blade group, the blade drive member may hit a mechanical movable end to bounce and thereby the blade group may be moved back from its original movement completion position to a position affecting an exposure of an image sensor. Therefore, such a problem due to the bounce of the blade drive member is required to be avoided. Thus, the shutters are often provided with a brake mechanism to reduce a speed of the blade drive member or a lock mechanism (bounce reduction mechanism) to lock the blade drive member so as to reduce its bounce.

Japanese Patent No. 4334092 discloses a focal-plane shutter provided with brake and lock mechanisms. This shutter causes a leading curtain drive member that drives a leading curtain, before completion of a movement of a trailing curtain, to move a brake member into a rotatable area of a trailing curtain drive member. Then, the brake member is deformed by contact of the rotating trailing curtain drive member and thereafter returns to its original shape, thereby reducing a speed of the trailing curtain drive member (that is, of the trailing curtain) and locking the trailing curtain drive member.

However, the brake member in the shutter disclosed in Japanese Patent No. 4334092 has flexibility (elasticity), so that, when the trailing curtain drive member has high motion energy at the completion of the movement of the trailing curtain and thereby a bouncing force thereof is large, the brake member cannot sufficiently reduce the bounce of the trailing curtain drive member.

Furthermore, when a fast shutter speed is set and thereby a difference between movement completion times of the leading and trailing curtains is small, the brake member that is located in the rotatable area of the trailing curtain drive member but whose position is unstable contacts the trailing curtain drive member, which makes the lock of the trailing curtain drive member unstable.

SUMMARY OF THE INVENTION

The present invention provides a focal-plane shutter capable of reducing bounce of its blade drive member more surely and more stably than conventional focal-plane shutters, and further provides an image capturing apparatus including the focal-plane shutter.

The present invention provides as an aspect thereof a focal-plane shutter including a base plate in which an aperture is formed, a blade movable with respect to the base plate so as to shut or open the aperture, a blade drive member connected to the blade and moving with respect to the base plate to move the blade, an acceleration member moving with respect to the base plate in contact with the blade drive member in part of a movable range of the blade to provide a driving force to the blade drive member, and a lock member including a stopper portion that contacts a contact portion of the blade drive member after completion of a movement of the blade to reduce bounce of the blade drive member. The lock member is movable between a first position where the stopper portion enters a movable area of the contact portion with a movement of the blade drive member and thereby the stopper portion is contactable with the contact portion and a second position where the stopper portion is located outside the movable area of the contact portion. The shutter further includes a biasing member biasing the lock member from the second position toward the first position. During the movement of the blade, the contact portion pushes the lock member and thereby the lock member is moved from the first position to the second position. Before the completion of the movement of the blade, the contact portion is away from the lock member and thereby the lock member is moved from the second position to the first position. After the completion of the movement of the blade, the acceleration member pushes the lock member and thereby the lock member is moved from the first position to the second position.

The present invention provides as another aspect thereof an image capturing apparatus including the above focal-plane shutter to control an exposure of an image sensor.

Further features and aspects of the present invention will become apparent from the following description of exemplary embodiments with reference to the attached drawings.

BRIEF DESCRIPTION OF THE DRAWINGS

FIGS. 1A and 1B are respectively a front view and a rear view of a focal-plane shutter that is an embodiment of the present invention.

FIG. 1C is an exploded perspective view of a blade chamber in the focal-plane shutter of the embodiment.

DESCRIPTION OF THE EMBODIMENTS

Exemplary embodiments of the present invention will hereinafter be described with reference to the accompanying drawings.

Figure 21:
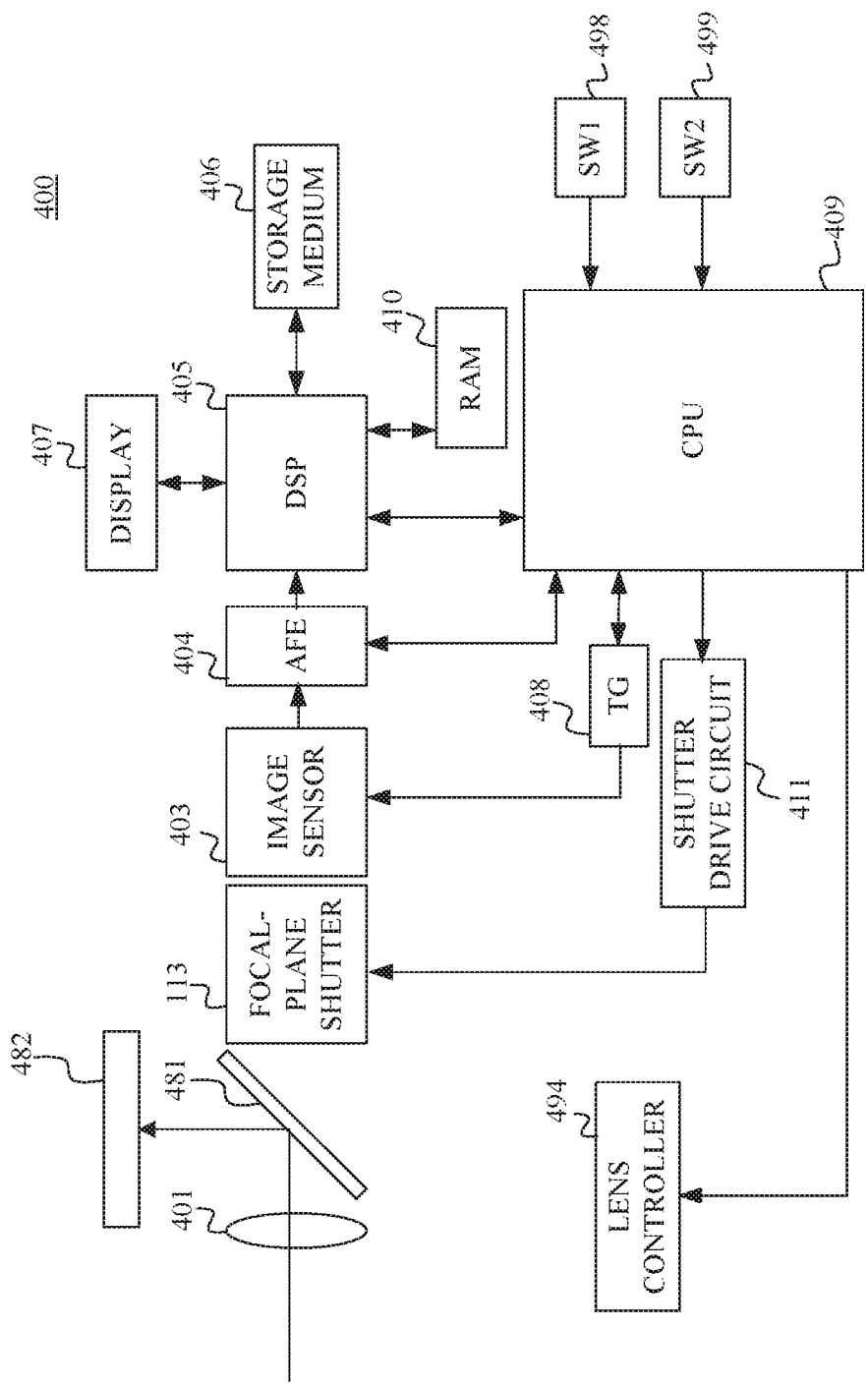
FIG. 21 is a block diagram illustrating a configuration of an image capturing apparatus provided with the focal-plane shutter of the embodiment.

FIG. 21 illustrates a configuration of an image capturing apparatus 400 provided with a focal-plane shutter 113 that is an embodiment of the present invention. An interchangeable lens including an image capturing lens 401 is detachably attachable to the image capturing apparatus 400. An image sensor 403 is constituted by a CCD sensor, a CMOS sensor or the like. The image capturing apparatus 400 is further provided with a mirror 481 and an optical viewfinder 482.

In an observation state illustrated in FIG. 21, part of a light flux passing through the image capturing lens 401 is reflected by the mirror 481 to be introduced to the optical viewfinder 482. A user (photographer) can observe an object image through the optical viewfinder 482.

In a live view state or an image capturing state after the mirror 481 is retracted out of an image capturing optical path, the light flux from the image capturing lens 401 proceeds to the focal-plane shutter 113 disposed on an object side further than the image sensor 403. A shutter drive circuit 411 controls operations of the focal-plane shutter 113.

The image capturing apparatus 400 is further provided with an image capturing preparation start switch (SW1) 498 and an image capturing start switch (SW2) 499.

The image capturing preparation start switch (SW1) 498 is turned on in response to a first stroke operation (half-press operation) of a release button (not illustrated), and the image capturing start switch (SW2) 499 is turned on in response to a second stroke operation (full-press operation) of the release button.

The image sensor 403 photoelectrically converts the object image formed by the image capturing lens 401. An analog signal output from the image sensor 403 is converted into a digital signal by an AFE (Analog Front End) 404. The digital signal output from the AFE 404 is input to a DSP (Digital Signal Processer) 405. The DSP 405 performs on the digital signal various image processes and a compression and decompression process to produce an image signal.

A recording medium 406 stores (records) the image signal (image data) produced by the DSP 405. A display unit 407 is constituted by a display device such as a liquid display device (LCD) and displays image data and various menus.

A timing generator (TG) 408 generates a timing signal for driving the image sensor 403. A RAM 410 is connected with the DSP 405 and temporarily stores the image data and others.

A lens controller 494 is provided in the interchangeable lens and outputs lens information on a focal length of the image capturing lens 401, an aperture stop diameter thereof, a diameter of an exit pupil thereof, a distance between the exit pupil and the image sensor 403 and others to a camera controller 409 in the image capturing apparatus 400. The lens controller 494 controls, in response to control signals from the camera controller 409, drive of the aperture stop, drive of a magnification-varying lens, drive of the focus lens and others.

A camera controller 409 controls the AFE 404, the DSP 405, the TG 408 and the shutter drive circuit 411.

Figure 2A:
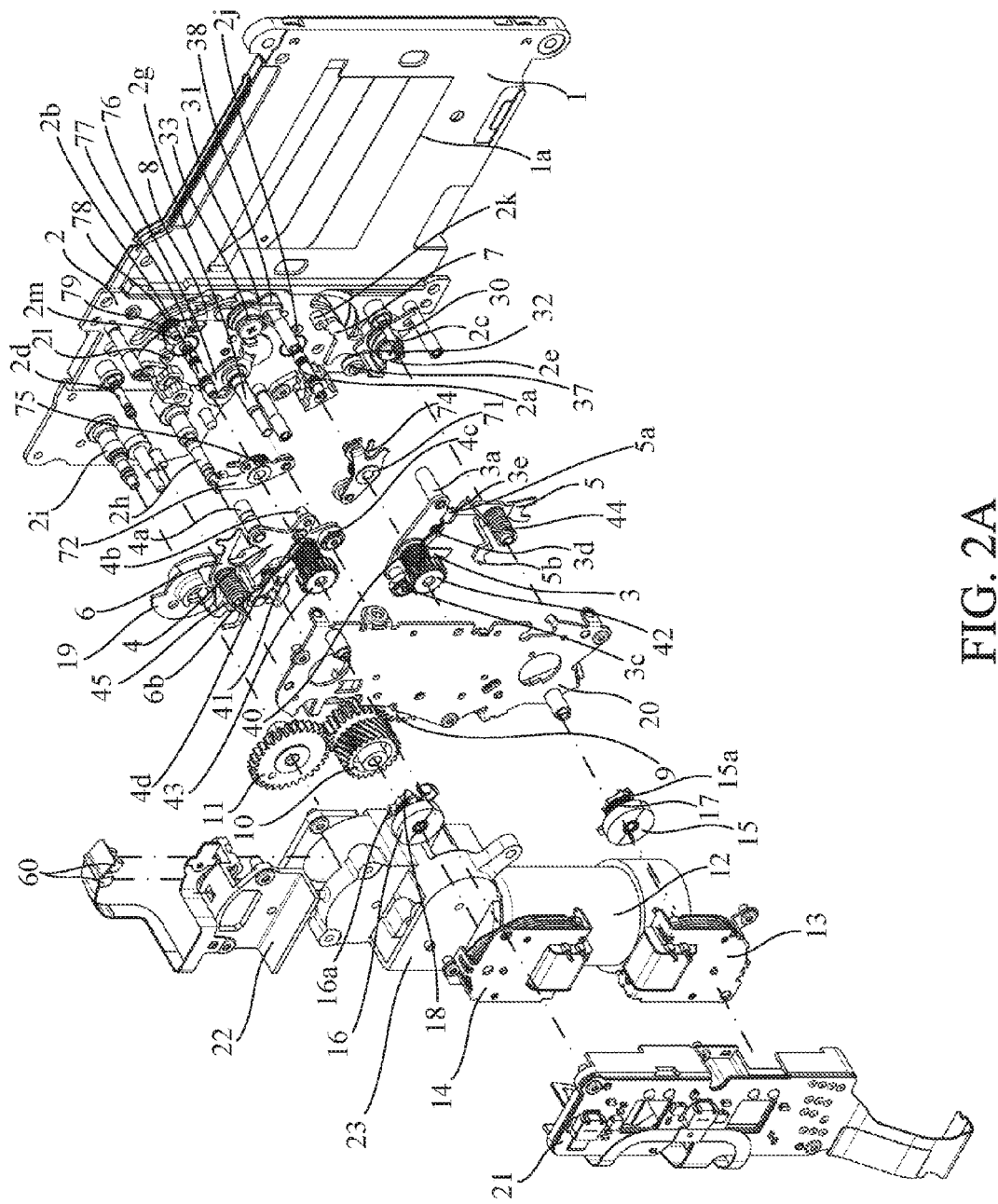
FIGS. 2A and 2B are respectively a front-side exploded perspective view and a rear-side exploded perspective view of a drive mechanism of the focal-plane shutter of the embodiment.
Figure 2B:
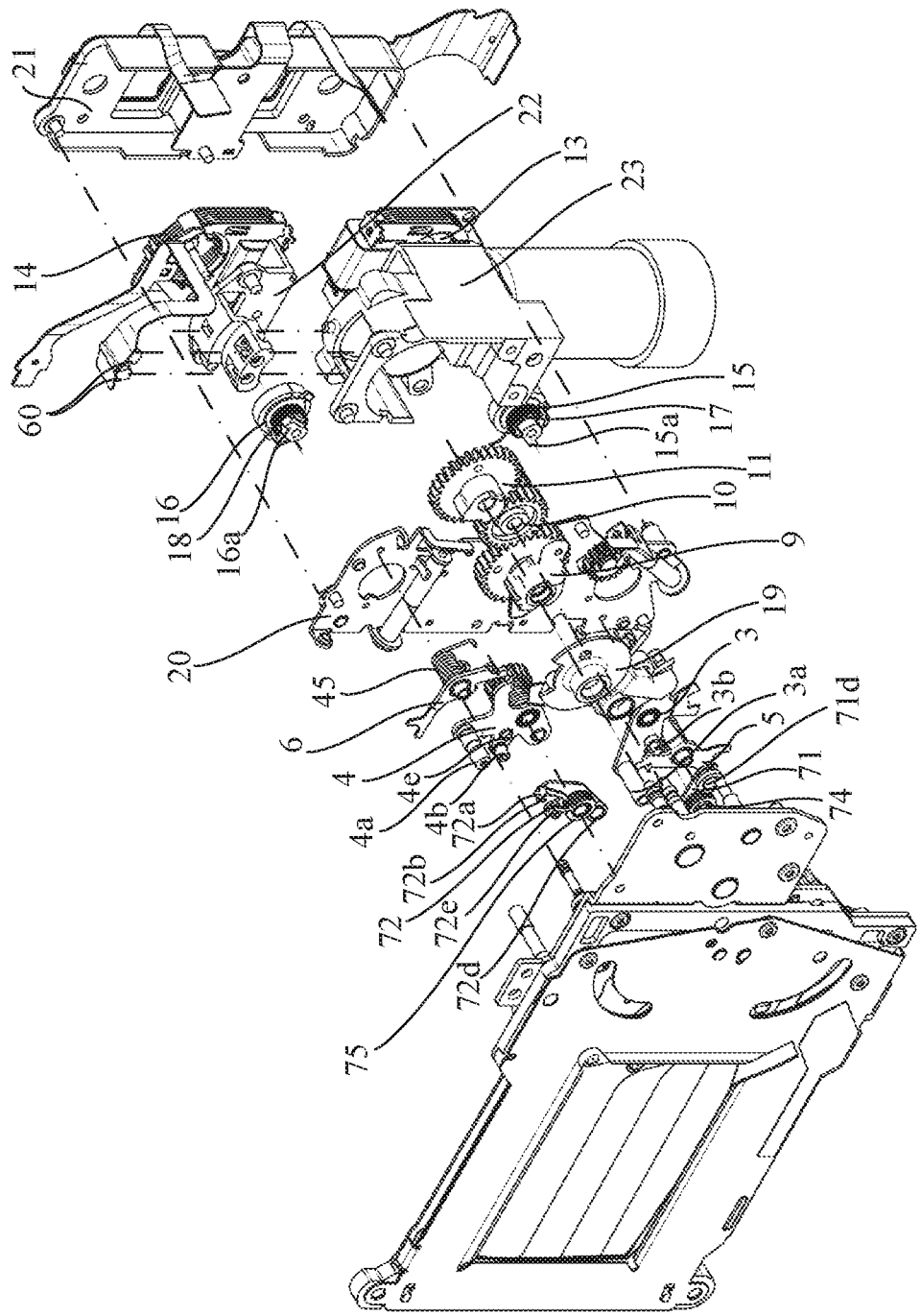
Figure 3A:
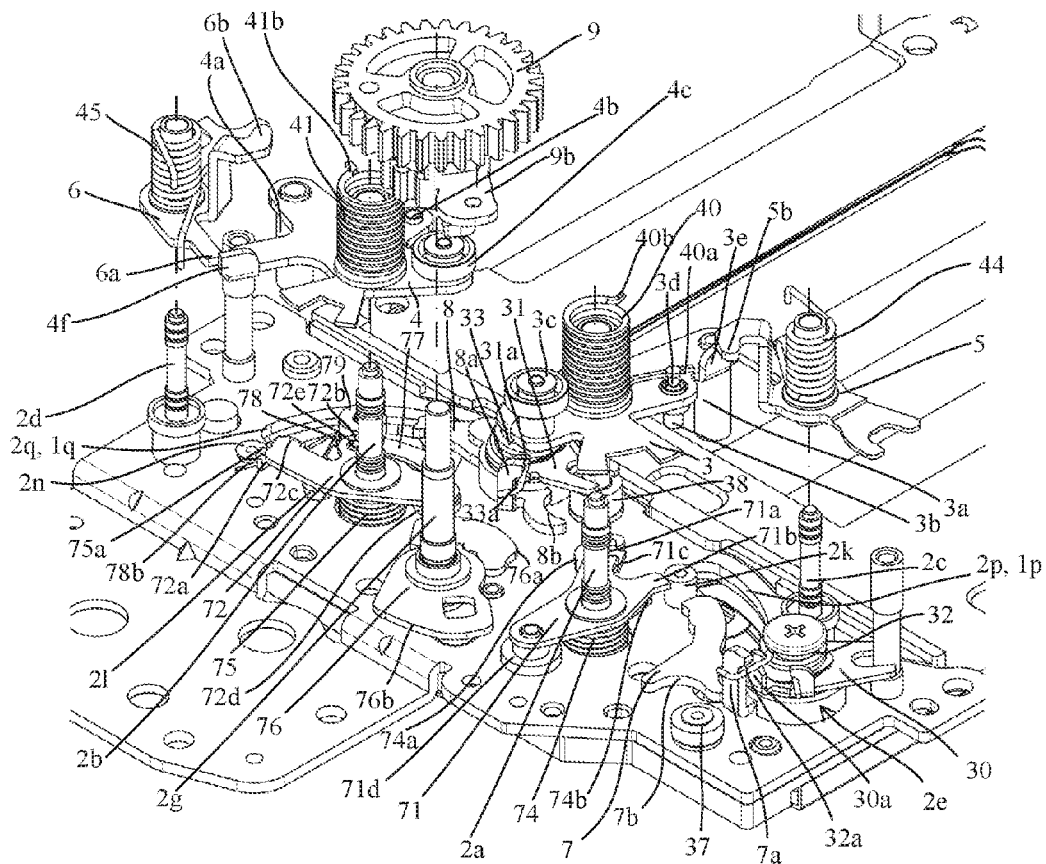
FIG. 3A is an exploded perspective view of the focal-plane shutter of the embodiment in its movement standby state.

With referring to FIGS. 1A, 1B, 2A, 2B and 3A, description will be made of a configuration of the focal-plane shutter 113 of this embodiment. FIGS. 1A and 1B respectively illustrate the focal-plane shutter 113 viewed from an object side and an image sensor side. FIG. 1C, which is an exploded perspective view, illustrates a blade chamber of the focal-plane shutter 113 viewed from the image sensor side. FIGS. 2A and 2B, which are exploded perspective views, respectively illustrate a drive mechanism of the focal-plane shutter 113 viewed from the object side and the image sensor side. FIG. 3A, which is an exploded and enlarged perspective view, illustrates the drive mechanism.

First, with mainly referring to FIG. 1C, description will be made of a configuration of the blade chamber. A retainer base plate 52 is disposed on the image sensor side further than a shutter base plate 1. The shutter base plate 1 and the retainer base plate 52 form therebetween a blade movement space. This blade movement space is divided into two by a partition plate 54 disposed between the shutter base plate 1 and the retainer base plate 52. The shutter base plate 1 and the partition plate 54 form therebetween a trailing curtain movement space for a trailing curtain unit 51 constituted by multiple trailing blades. The retainer base plate 52 and the partition plate 54 form therebetween a leading curtain movement space for a leading curtain unit 50 constituted by multiple leading blades.

A spacer 53a secures a space between the trailing curtain unit 51 and the shutter base plate 1. A spacer 53b secures a space between the trailing curtain unit 51 and the partition plate 54. A spacer 53c secures a space between the leading curtain unit 50 and the retainer base plate 52.

A backlash removing spring 56 removes backlash in the leading curtain unit 50. Another backlash removing spring 57 removes backlash in the trailing curtain unit 51.

The shutter base plate 1, the retainer base plate 52 and the partition plate 54 are respectively provided with apertures 1a, 52a and 54a. These apertures 1a, 52a and 54a mutually overlap to form an exposure aperture through which a light flux is able to pass toward the image sensor 403. The leading and trailing curtain units 50 and 51 are movable with respect to the shutter base plate 1 so as to shut or open the exposure aperture (1*a*, 52*a* and 54*a*).

A slit-forming portion 50*a* of the leading curtain unit 50 forms, with a slit-forming portion 51*a* of the trailing curtain unit 51, a slit through which the light flux passes in the exposure aperture. The slit-forming portion 50*a* of the leading curtain unit 50 sets an exposure start time for the image sensor 403, and the slit-forming portion 51*a* of the trailing curtain unit 51 sets an exposure end time for the image sensor 403

Next, with mainly referring to FIGS. 2A, 2B and 3A, description will be made of a configuration of the drive mechanism that drives the leading and trailing curtain units 50 and 51. FIGS. 2A, 2B and 3A illustrate a configuration of the drive mechanism in a movement standby state.

A sub base plate 2 connected with the shutter base plate 1 is provided with, on its object side and its image sensor side, multiple shafts 2*a*, 2*b*, 2*c*, 2*d*, 2*e*, 2*f*, 2*g*, 2*h* and 2*i*. On the shaft 2*a* a leading drive lever 3 and a leading boost lever 71 are rotatably mounted, and on the shaft 2*b* a trailing drive lever 4 as a blade drive member and a trailing boost lever 72 as an acceleration member are rotatably mounted. On the shaft 2*c* a leading clamp lever 5 is rotatably mounted, and on the shaft 2*d* a trailing clamp lever 6 is rotatably mounted. On the shaft 2*e* a leading brake lever 7 is rotatably mounted, and on the shaft 2*f* a trailing brake lever 8 is rotatably mounted. On the shaft 2*g* a charging cam gear 9 is rotatably mounted, and on the shaft 2*h* a reduction gear 10 is rotatably mounted. On the shaft 2*i* a phase gear 11 is rotatably mounted.

An intermediate plate 20 is connected to the shafts 2*a* to 2*i* provided to the sub base plate 2 and retains these levers or gears mounted on these shafts 2*a* to 2*i*. A leading rotor unit 15 constitutes, with a leading magnetic circuit unit 13, an actuator that controls an operation time of the leading drive lever 3. A trailing rotor unit 16 constitutes, with a trailing magnetic circuit unit 14, an actuator that controls an operation time of the trailing drive lever 4.

An electric circuit unit 21 supplies the leading and trailing magnetic circuit units 13 and 14. A charge motor 12 and gear covers 22 and 23 are provided. A photo interrupter 60 detects a phase of the phase gear 11 and is fixed to the gear cover 22.

The leading rotor unit 15 is rotatably mounted on a shaft (not illustrated) provided in the leading magnetic circuit unit 13. The leading rotor unit 15 is provided with a leading rotor return spring 17. The leading rotor return spring 17 biases the leading rotor unit 15 in a clockwise direction in FIG. 2A (when viewed from the object side) and in a counter clockwise direction in FIG. 2B. The leading rotor unit 15 has a push portion 15*a*. In the movement standby state, the leading rotor unit 15 is biased by the leading rotor return spring 17 and thereby the push portion 15*a* contacts a receiving portion (not illustrated) of the intermediate plate 20, which positions the leading rotor unit 15 at its standby position.

Similarly, the trailing rotor unit 16 is rotatably mounted on a shaft (not illustrated) provided in the trailing magnetic circuit unit 14. The trailing rotor unit 16 is provided with a trailing rotor return spring 18. The trailing rotor return spring 18 biases the trailing rotor unit 16 in the clockwise direction in FIG. 2A and in the counter clockwise direction in FIG. 2B. The trailing rotor unit 16 has a push portion 16*a*. In the movement standby state, the trailing rotor unit 16 is biased by the trailing rotor return spring 18 and thereby the push portion 16*a* contacts another receiving portion (not illustrated) of the intermediate plate 20, which positions the trailing rotor unit 16 at its standby position.

Figure 5A:
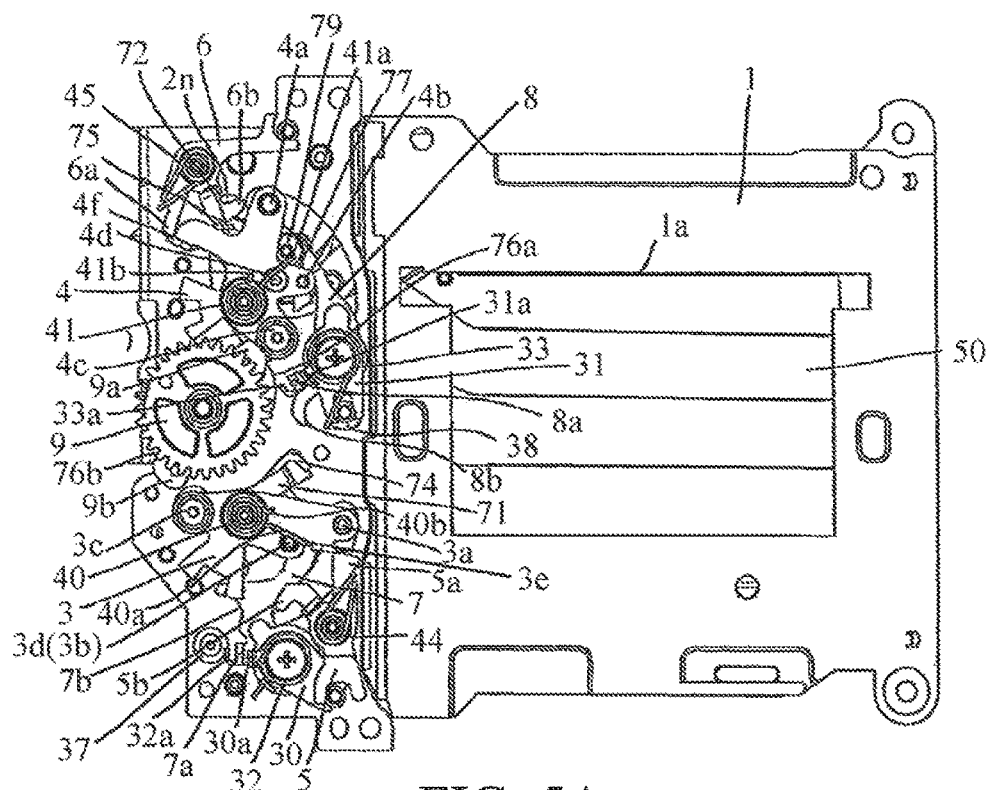
FIGS. 5A and 5B illustrate the focal-plane shutter of the embodiment in the movement standby state.
Figure 5B:
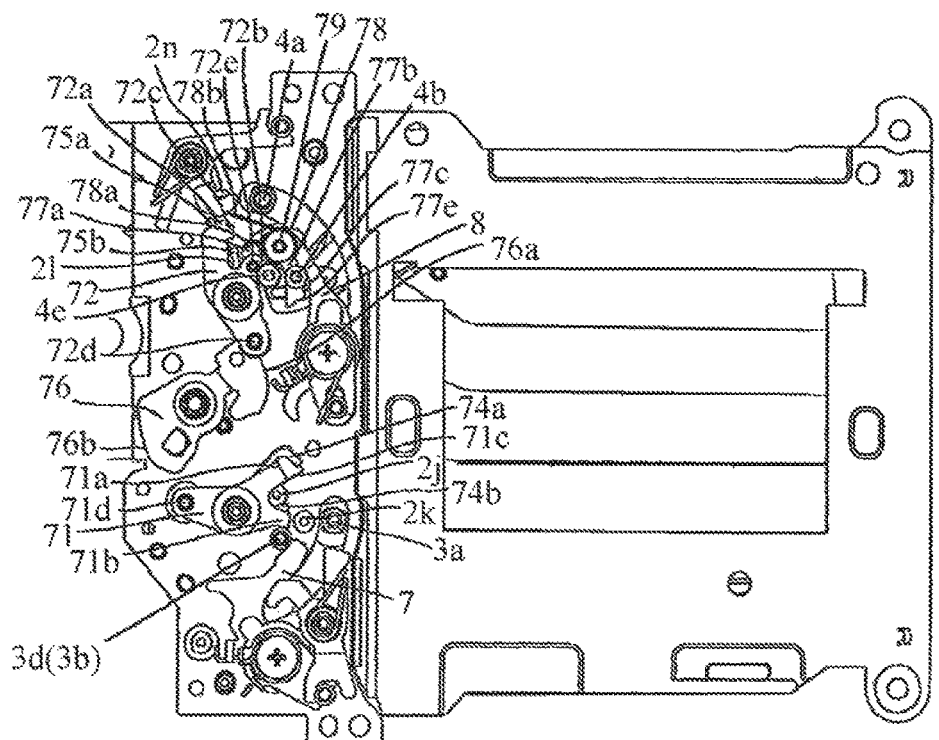

Description will be made of a control mechanism that controls drive of the movement of the leading and trailing curtain units 50 and 51 with referring to FIGS. 5A and 5B. FIG. 5A illustrates a configuration in the movement standby state, in which an upper part (including the charge motor 12, the rotor units 15 and 16, the electric circuit unit 14, the gear covers 22 and 23 and others) is removed from the intermediate plate 20. FIG. 5B illustrates a configuration in the movement standby state in which the leading drive lever 3, the trailing drive lever 4, the charge cam gear 9, a leading main spring 40 and a trailing main spring 41 are further removed from the configuration illustrated in FIG. 5A.

In the movement standby state, the leading drive lever 3 is biased by the leading main spring 40 in a clockwise direction in FIG. 5A, and the leading clamp lever 5 is biased by a leading clamp return spring 44 in a counter clockwise direction in FIG. 5A. The leading drive lever 3 engages at its bend portion 3*e* with an engagement portion 5*a* of the leading clamp lever 5, thereby being stopped.

Energizing the leading magnetic circuit unit 13 from the electric circuit unit 21 rotates the leading rotor unit 15 in the counter clockwise direction and thereby its push portion 15*a* contacts an engagement release portion 5*b* of the leading clamp lever 5 to rotate this leading clamp lever 5 in the clockwise direction. The rotation of the leading clamp lever 5 releases the engagement between the bend portion 3*e* of the leading drive lever 3 and the engagement portion 5*a* of the leading clamp lever 5, which allows a biasing force generated by the leading main spring 40 to rotate the leading drive lever 3 in the clockwise direction. Simultaneously, the leading curtain unit 50 connected to the leading drive lever 3 starts its operation in a direction in which its multiple leading blades, which have mutually spread out, mutually overlap (downward in FIGS. 5A and 5B).

In the movement standby state, the trailing drive lever 4 is biased by the trailing main spring 41 in the clockwise direction in FIG. 5A, and the trailing clamp lever 6 is biased by a trailing clamp return spring 45 in the counter clockwise direction in FIG. 5A. The trailing drive lever 4 engages at its bend portion 4*f* with an engagement portion 6*a* of the trailing clamp lever 6, thereby being stopped.

Energizing the trailing magnetic circuit unit 14 from the electric circuit unit 21 rotates the trailing rotor unit 16 in the counter clockwise direction and thereby its push portion 16*a* contacts an engagement release portion 6*b* of the trailing clamp lever 6 to rotate this trailing clamp lever 6 in the clockwise direction. The rotation of the trailing clamp lever 6 releases the engagement between the bend portion 4*f* of the trailing drive lever 4 and the engagement portion 6*a* of the trailing clamp lever 6, which allows a biasing force generated by the trailing main spring 41 to rotate the trailing drive lever 4 in the clockwise direction. Simultaneously, the trailing curtain unit 51 connected to the trailing drive lever 4 starts its operation in a direction in which its multiple trailing blades, which have mutually overlapped, mutually spread out (downward in FIGS. 5A and 5B).

Figure 3B:
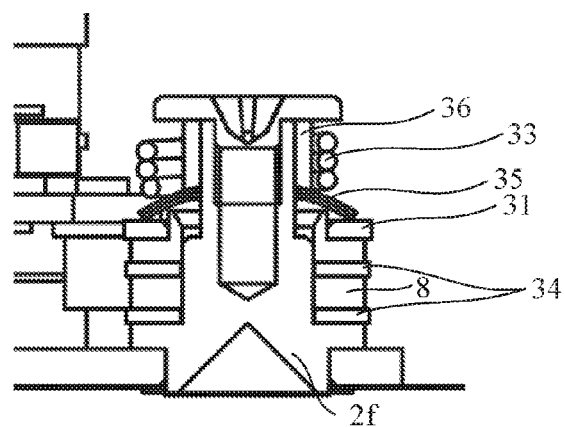
FIG. 3B is a sectional view of a brake mechanism in the focal-plane shutter of the embodiment.

FIGS. 3A and 3B illustrate a configuration of a trailing brake mechanism including the above-described trailing brake lever 8. Components constituting the trailing brake mechanism are fixedly or rotatably mounted on the shaft 2*f*. The trailing brake lever 8 is disposed between brake sheets 34 and pressed via a trailing brake fixing plate 31 by a pressing force generated by a plate spring 35 pressed and deformed by a predetermined amount set by a braking force adjustment member 36. This configuration generates a frictional force as a resistance to the rotation of the trailing brake lever 8 about the shaft 2*f*.

Around the braking force adjustment member 36, a trailing brake return spring 33 is disposed. The trailing brake return spring 33 has a movable end 33a engaging with the trailing brake lever 8 and a trailing brake fixing plate 31, which causes a biasing force from the trailing brake return spring 33 to act on the trailing brake lever 8 via the movable end 33a. The biasing force becomes, during the trailing curtain unit 51, a braking force for braking the trailing drive lever 4 and becomes, during a charge operation to return the trailing brake lever 8 to its standby position, an assistance force for assisting the charge operation. A leading brake mechanism including the leading brake lever 7 has a configuration identical to that of the trailing brake mechanism.

Furthermore, in FIG. 3A, the leading drive lever 3 is provided with a leading curtain drive pin 3a that penetrates, as illustrated in FIG. 1C, through arc-shaped groove portions 1p and 2p respectively formed in the shutter and sub base plates 1 and 2 and is connected to the leading curtain unit 50. The leading curtain drive pin 3a contacts the leading brake lever 7 and rotates integrally therewith at an end of the movement of the leading curtain unit 50, thereby converting motion energy of the leading curtain unit 50 and components for driving this leading curtain unit 50 into frictional energy on the brake sheets 34. In addition, the leading curtain drive pin 3a converts the motion energy into elastic energy that charges the leading brake return spring 32.

The leading drive lever 3 is further provided with a leading brake charge pin 3b that returns the leading brake lever 7 to its standby position in a process of the return of the leading drive lever 3 to its standby position. In the process of the return of the leading brake lever 7, the leading brake return spring 32 releases its elastic energy accumulated with the movement of the leading curtain unit 50 to bias the leading brake lever 7 toward the standby position. This configuration enables reducing energy to be newly provided for returning the leading brake lever 7 to the standby position.

Furthermore, a leading brake fixing plate 30 is provided with a spring engagement portion 30a that allows, near the standby position, switching a member with which the movable end 32a of the leading brake return spring 32 engages from the leading brake lever 7 to the leading brake fixing plate 30. That is, near the standby position, the movable end 32a of the leading brake return spring 32 engages with the spring engagement portion 30a of the leading brake fixing plate 30 and therefore does not bias the leading brake lever 7.

On the other hand, in a range other than near the standby position, the movable end 32a of the leading brake return spring 32 engages with a spring engagement portion 7a of the leading brake lever 7 to bias the leading brake lever 7 in a rotation direction toward the standby position. Thus, if the leading brake return spring 32 has a strong spring force, the leading brake lever 7 is not biased at the standby position and therefore is not moved after completion of the charge by the leading brake charge pin 3b of the leading drive lever 3.

In other words, the leading brake lever 7 is held at its charge completion position at which its charge by the leading brake charge pin 3b completes, which is its original standby position, until the leading curtain drive pin 3a contacts the leading brake lever 7. This configuration can minimize a possibility that, after the completion of the charge, the leading brake lever 7 moves and thereby a contact position between the leading curtain drive pin 3a and the leading brake lever 7 changes and further thereby a movement characteristic of the leading curtain unit 50 changes. Moreover, increasing the spring force of the leading brake return spring 32 increases an amount of energy recovered as the elastic energy of the leading brake return spring 32 from the motion energy used for moving the leading curtain unit 50. This recovered energy is reused to return the leading brake lever 7 to its initial position, which enables reducing the newly provided energy and thereby enables reducing a load of the charge.

The leading drive lever 3 is provided with a roller 3c attached thereto which is a cam follower that receives a rotating force from a cam portion of the charge cam gear 9 when the leading drive lever 3 is returned from its rotation completion position corresponding to where the movement of the leading curtain unit 50 completes to its standby position.

The leading main spring 40 disposed coaxially with a rotation center of the leading drive lever 3 has a movable end 40a engaging with a boss 3d of the leading drive lever 3 and a fixed end 40b engaging with a leading worm wheel 42, which generates a driving force to rotate the leading drive lever 3 at a predetermined rotation speed.

The leading boost lever 71 is mounted on the shaft 2a of the sub base plate 2 rotatably and coaxially with the rotation center of the leading drive lever 3. For this leading boost lever 71, a leading boost spring 74 is provided. The leading boost spring 74 has a movable end 74a engaging with a spring engagement portion 71a of the leading boost lever 71 and a fixed end 74b engaging with a boss 2j of the sub base plate 2. The leading boost lever 71 biased by the leading boost spring 74 biases at its push portion 71b, via the leading brake charge pin 3b, the leading drive lever 3 located at the standby position in a leading curtain movement direction in which the leading drive lever 3 moves the leading curtain unit 50.

However, a rotation of the leading drive lever 3 by a predetermined amount causes a rotation limiter 71c of the leading boost lever 71 to contact a boss 2k of the sub base plate 2, which stops the leading boost lever 71 from biasing the leading drive lever 3 in a subsequent rotatable range of the leading drive lever 3. This configuration enables, only in a first half of the rotatable range of the leading drive lever 3 (that is, only in a first half movable range of the leading curtain unit 50 as part of the movable range thereof), providing a rotating force (driving force) generated by the leading boost spring 74 to the leading drive lever 3. As a result, this configuration enables balancing spring forces between the leading main spring 40 that rotates the leading drive lever 3 at the predetermined rotation speed and the leading boost spring 74. Furthermore, this configuration enables balancing charge loads between these springs 40 and 74 when the leading drive lever 3 is returned from the rotation completion position to the standby position, which makes it possible to reduce a peak of the entire charge load.

The leading boost lever 71 is provided with a roller 71d attached thereto which is a cam follower that receives a rotating force from a cam portion of a boost cam 76 rotating integrally with the charge cam gear 9 when the leading boost lever 71 is returned from its rotation completion position where the leading boost lever 71 contacts the boss 2k to its standby position.

The trailing drive lever 4 is provided with a trailing curtain drive pin 4a that penetrates, as illustrated in FIG. 1C, through arc-shaped groove portions 1q and 2q respectively formed in the shutter and sub base plates 1 and 2 and is connected to the trailing curtain unit 51. The trailing curtain drive pin 4a contacts the trailing brake lever 8 and rotates integrally therewith at an end of the movement of the trailing curtain unit 51, thereby converting motion energy of the trailing curtain unit 51 and components for driving this trailing curtain unit 51 into frictional energy on the brake sheets 34. In addition, the trailing curtain drive pin 4a converts the motion energy into elastic energy that charges the trailing brake return spring 33.

The trailing drive lever 4 is further provided with a trailing brake charge pin 4b that returns the trailing brake lever 8 to its standby position in a process of the return of the trailing drive lever 4 to its standby position. In the process of the return of the trailing brake lever 8, the trailing brake return spring 33 releases its elastic energy accumulated with the movement of the trailing curtain unit 51 to bias the trailing brake lever 8 toward the standby position. This configuration enables reducing energy to be newly provided for returning the trailing brake lever 8 to the standby position.

Furthermore, a trailing brake fixing plate 31 is provided with a spring engagement portion 31a that allows, near the standby position, switching a member with which the movable end 33a of the trailing brake return spring 33 engages from the trailing brake lever 8 to the trailing brake fixing plate 31. That is, near the standby position, the movable end 33a of the trailing brake return spring 33 engages with the spring engagement portion 31a of the trailing brake fixing plate 31 and therefore does not bias the trailing brake lever 8.

On the other hand, in a range other than near the standby position, the movable end 33a of the trailing brake return spring 33 engages with a spring engagement portion 8a of the trailing brake lever 8 to bias the trailing brake lever 8 in a rotation direction toward the standby position. Thus, if the trailing brake return spring 33 has a strong spring force, the trailing brake lever 8 is not biased at the standby position and therefore is not moved after completion of the charge by the trailing brake charge pin 4b of the trailing drive lever 4.

In other words, the trailing brake lever 8 is held at its charge completion position that is its original standby position by the trailing brake charge pin 4b until the trailing curtain drive pin 4a contacts the trailing brake lever 8. This configuration can minimize a possibility that, after the completion the charge, the trailing brake lever 8 moves and thereby a contact position between the trailing curtain drive pin 4a and the trailing brake lever 8 changes and further thereby a movement characteristic of the trailing curtain unit 51 changes. Moreover, increasing the spring force of the trailing brake return spring 33 increases an amount of energy recovered as the elastic energy of the trailing brake return spring 33 from the motion energy used for moving the trailing curtain unit 51. This recovered energy is reused to return the trailing brake lever 8 to its initial position, which enables reducing the newly provided energy and thereby enables reducing a load of the charge.

The trailing drive lever 4 is provided with a roller 4c attached thereto which is a cam follower that receives a rotating force from the cam portion of the charge cam gear 9 when the trailing drive lever 4 is returned from its rotation completion position corresponding to where the movement of the trailing curtain unit 51 completes to its standby position.

The trailing main spring 41 disposed coaxially with a rotation center of the trailing drive lever 4 has a movable end 41a engaging with a boss 4d of the trailing drive lever 4 and a fixed end 41b engaging with a trailing worm wheel 43, which generates a driving force to rotate the trailing drive lever 4 at a predetermined rotation speed.

The trailing boost lever 72 is mounted on the shaft 2b of the sub base plate 2 rotatably and coaxially with the rotation center of the trailing drive lever 4. For this trailing boost lever 72, a trailing boost spring 75 is provided. The trailing boost spring 75 has a movable end 75a engaging with a spring engagement portion 72a of the trailing boost lever 72 and a fixed end 75b engaging with a boss 2l of the sub base plate 2. The trailing boost lever 72 biased by the trailing boost spring 75 biases at its push portion 72b, via a boss 4e of the trailing drive lever 4, the trailing drive lever 4 located at the standby position in a trailing curtain movement direction in which the trailing drive lever 4 moves the trailing curtain unit 51.

However, a rotation of the trailing drive lever 4 by a predetermined amount causes a rotation limiter 72c of the trailing boost lever 72 to contact a stopper 79 mounted on a boss 2m of the sub base plate 2, which stops the trailing boost lever 72 from biasing the trailing drive lever 4 in a subsequent rotatable range. This configuration enables, only in a first half of the rotatable range of the trailing drive lever 4 (that is, only in a first half movable range of the trailing curtain unit 51 as part of the movable range thereof), providing a rotating force (driving force) generated by the trailing boost spring 75 to the trailing drive lever 4. As a result, this configuration enables balancing spring forces between the trailing main spring 41 that rotates the trailing drive lever 4 at the predetermined rotation speed and the trailing boost spring 75. Furthermore, this configuration enables balancing charge loads between these springs 41 and 74 when the trailing drive lever 4 is returned from the rotation completion position to the standby position, which makes it possible to reduce a peak of the entire charge load.

The trailing boost lever 72 is provided with a roller 72d attached thereto which is a cam follower that receives a rotating force from the cam portion of the boost cam 76 rotating integrally with the charge cam gear 9 when the trailing boost lever 72 is returned from its rotation completion position where the trailing boost lever 72 contacts the stopper 79 to its standby position.

A leading brake stopper rubber 37 sets a rotation completion position of the leading brake lever 7. A trailing brake stopper rubber 38 sets a rotation completion position of the trailing brake lever 8.

A lock lever 77 is provided as a lock member that reduces bounce of the trailing curtain unit 51 from the trailing brake lever 8 after completion of the movement of the trailing curtain unit 51.

Figure 4A:
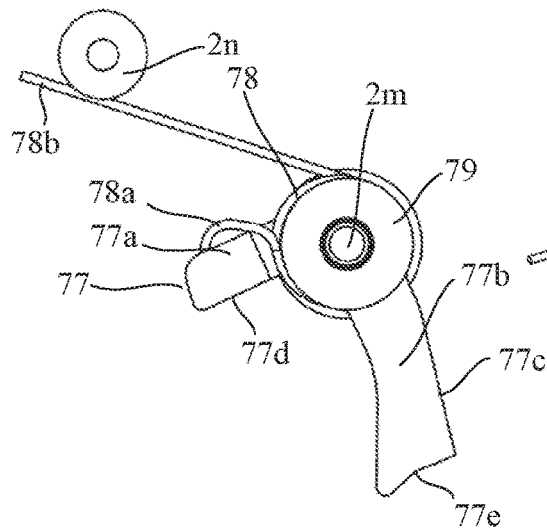
FIGS. 4A to 4D are respectively a front view and an exploded perspective view of a lock lever in the focal-plane shutter of the embodiment in the movement standby state and after its movement completion state.
Figure 4B:
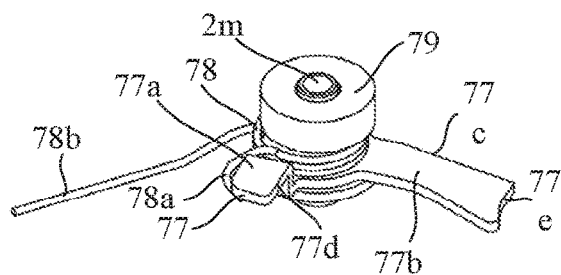
Figure 4C:
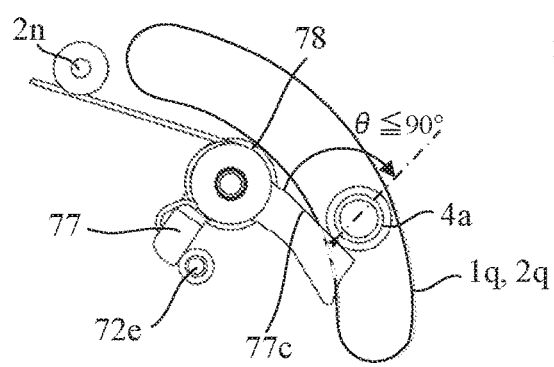
Figure 4D:
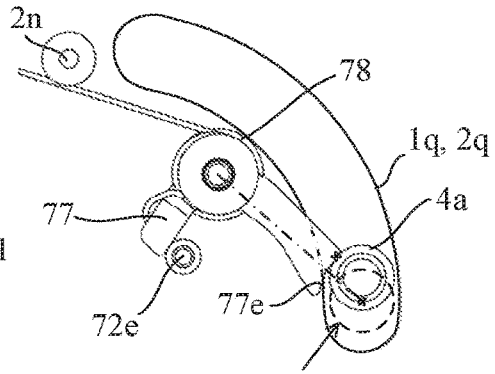

FIGS. 4A to 4C illustrate the lock lever 77 in the movement standby state. FIG. 4D illustrates the lock lever 77 after the completion of the movement of the trailing curtain unit 51. The lock lever 77 is rotatably mounted on a boss 2m of the sub base plate 2. For this lock lever 77, a lock spring 78 as a biasing member is provided. The lock spring 78 has a movable end 78a engaging with a spring engagement portion 77a of the lock lever 77 and a fixed end 78b engaging with a boss 2n of the sub base plate 2.

The lock lever 77 has an arm 77b. The arm 77b has a first cam surface (first cam portion) 77c formed on its side surface and a stopper surface (stopper) 77e formed at its tip (lower end). Furthermore, the lock lever 77 has a second cam surface (second cam portion) 77d formed on a side surface of the spring engagement portion 77a.

The lock lever 77 is rotatable to a lock position as a first position where, as illustrated in FIGS. 4C and 4D, the first cam surface 77c and the stopper surface 77e enter a rotatable area (movable area) of the trailing curtain drive pin 4a that rotates (moves) in the groove portions 1q and 2q. At the lock position, as described later, the stopper surface 77e is contactable with the trailing curtain drive pin 4a. The lock lever 77 is rotatable also to an unlock position as a second position where the first cam surface 77c and the stopper surface 77e are located outside the rotatable area of the trailing curtain drive pin 4a.

The lock spring 78 biases the lock lever 77 from the unlock position toward the lock position. However, when the trailing drive lever 4 is located at the standby position, an unlock pin 72e provided on the trailing boost lever 72 contacts the second cam surface 77d of the lock lever 77, which prevents the lock lever 77 from rotating toward the lock position (that is, in a lock direction) and thereby holds the lock lever 77 at the unlock position.

FIG. 4D illustrates a state where the trailing curtain drive pin 4a of the trailing drive lever 4 bouncing after the completion of the movement of the trailing curtain unit 51 contacts the stopper surface 77e of the lock lever 77.

During the movement of the trailing curtain unit 51, that is, when the trailing drive lever 4 and the trailing boost lever 72 (unlock pin 72e) having started their rotations each reach a rotation position corresponding to a predetermined rotation amount, the lock lever 77 is rotated to the lock position by a biasing force generated by the lock spring 78. Thereby, the arm 77b of the lock lever 77, that is, the first cam surface 77c and the stopper surface 77e enter the rotatable area of the trailing curtain drive pin 4a.

Thereafter, before the completion of the movement of the trialing curtain unit 51, as illustrated in FIG. 4C, the trailing curtain drive pin 4a contacts the first cam surface 77c of the lock lever 77. Furthermore, the trailing curtain drive pin 4a rotates in contact with the first cam surface 77c of the lock lever 77, that is, rotates while sliding along the first cam surface 77c to cause the lock lever 77 to rotate toward the unlock position so as to move the first cam surface 77c and the stopper surface 77e outside the rotatable area of the trailing curtain drive pin 4a. As illustrated in FIG. 4C, the first cam surface 77c of the lock lever 77 is formed such that a contact angle θ thereof with the trailing curtain drive pin 4a is 90° or less in the rotation of the lock lever 77. This contact angle suppresses an increase of a rotation load of the trailing curtain drive pin 4a (that is, of the trailing drive lever 4) sliding with respect to the first cam surface 77c, which enables reducing an influence of the rotation load on the movement characteristic of the trailing curtain unit 51.

Then, when the trailing drive lever 4 rotates close to the rotation completion position and the trailing curtain drive pin 4a moves along the first cam surface 77c and then moves away therefrom, the lock lever 77 rotates again to the lock position by the biasing force of the lock spring 78 and thereby the first cam surface 77c and the stopper surface 77e enter the rotatable area of the trailing curtain drive pin 4a. The stopper surface 77e contacts, when the trailing drive lever 4 hits the trailing brake lever 8 and bounces, the trailing curtain drive pin 4a to stop further return (rotation) of the trailing drive lever 4, that is, to lock the trailing drive lever 4. The position of the stopper surface 77e thereat is set so as to contact the trailing curtain drive pin 4a in a state where the slit-forming portion 51a of the trailing curtain unit 51 is located below a lower end of the aperture 1a of the shutter base plate 1, which prevents the slit-forming portion 51a from returning into the aperture 1a and thereby prevents a re-exposure of the image sensor 403.

Furthermore, as illustrated in FIG. 4D, a contact position on the stopper surface 77e of the lock lever 77 with the trailing curtain drive pin 4a after the completion of the rotation of the trailing drive lever 4 (that is, in a movement completion state of the trailing curtain unit 51) is set to a position closer to the first cam surface 77c than a straight line (illustrated by a dashed-dotted line) connecting between a rotation center of the lock lever 77 and a center of the trailing curtain drive pin 4a at the completion of the movement of the trailing curtain unit 51. In other words, the contact position is located on an opposite side to the unlock position across the above straight line. In further other words, the stopper surface 77e is provided so as to contact the trailing curtain drive pin 4a when the lock lever 77 is located at the lock position and thereby to cause the lock lever 77 to receive a force toward a direction opposite to the unlock position. This configuration can prevent the trailing curtain drive pin 4a bouncing and then contacting the stopper surface 77e from moving the lock lever 77 toward the unlock position and thereby being unable to stop the return of the trailing drive lever 4 (that is, the re-exposure of the image sensor 403).

Moreover, this embodiment achieves the above-described bounce reduction operation using the lock lever 77 for the trailing drive lever 4 (that is, for the trailing curtain unit 51) and the charge operation (described later), only by the mechanism for driving the trailing curtain unit 51. Thus, when only the trailing curtain unit 51 is moved in image capturing using an electronic leading curtain, this embodiment can provide a bounce reduction effect for the trailing curtain unit 51.

Although this embodiment has the configuration in which the brake mechanism is also used as a mechanism for bounce reduction (bounce reduction mechanism), the brake mechanism and the bounce reduction mechanism are completely independent from each other. Therefore, for example, if no brake mechanism is provided, the bounce reduction mechanism can provide an effect equivalent to the above-mentioned bounce reduction effect. That is, the brake mechanism can be eliminated.

Next, description will be made of a charge mechanism. As illustrated in FIGS. 2A and 2B, the shutter of this embodiment transmits a drive power from the charge motor 12 via the reduction gear 10 to the charge cam gear 9 to perform the charge operation. In addition, this embodiment monitors a rotation of a phase plate 19 rotatable integrally with the phase gear 11 meshing with the reduction gear 10 by using the photo interrupter 60 to detect a stop phase of the charge cam gear 9 and control energization of the charge motor 12.

Next, with referring to FIGS. 5A and 5B to FIGS. 13A and 13B, an exposure operation in the shutter of this embodiment will be described step by step. The following description will be made of, for simplification, operations under a condition that, after the movement of the leading curtain unit 50 completes, the trailing curtain unit 51 starts its movement. As described above, FIGS. 5A and 5B illustrate the movement standby state, and FIGS. 6A and 6B to FIGS. 13A and 13B illustrate operation states subsequent to the movement standby state. Each of FIGS. 6A, 7A, 8A, 9A, 10A, 11A, 12A and 13A illustrates, as well as FIG. 5A, the configuration in which the upper part is removed from the intermediate plate 20. Each of FIGS. 6B, 7B, 8B, 9B, 10B, 11B, 12B and 13B illustrates, as well as FIG. 5B, the configuration in which the leading drive lever 3, the trailing drive lever 4, the charge cam gear 9, the leading main spring 40 and the trailing main spring 41 are further removed.

In the movement standby state illustrated in FIGS. 5A and 5B, as described above, the leading drive lever 3 engages with the leading clamp lever 5 to be stopped, and the trailing drive lever 4 engages with the trailing clamp lever 6 to be stopped.

Figure 6A:
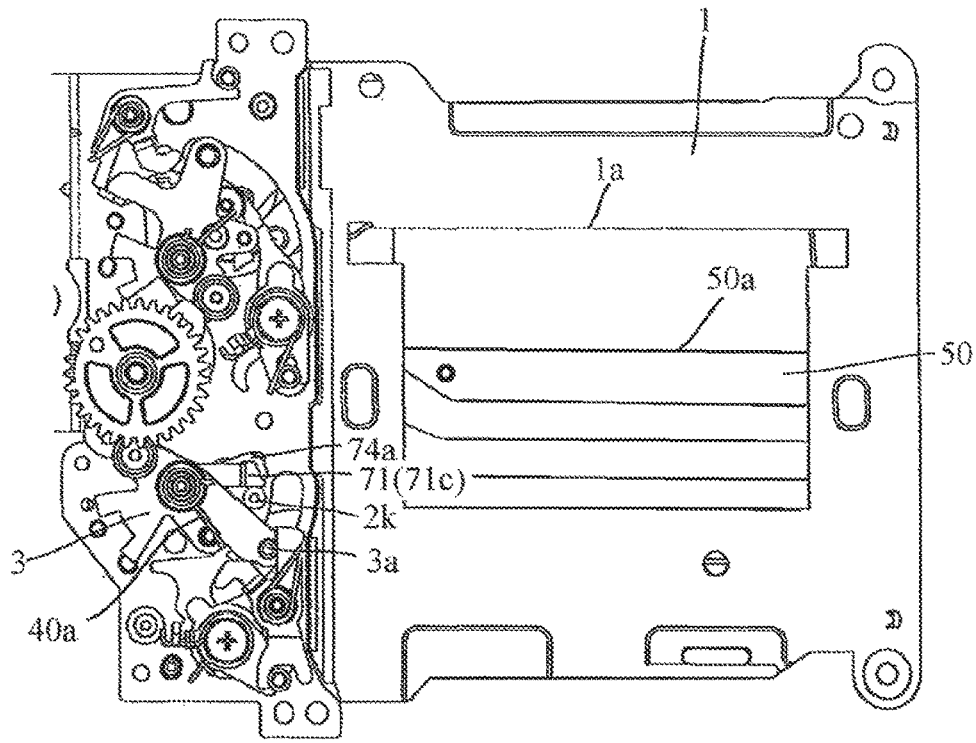
FIGS. 6A and 6B illustrate the focal-plane shutter of the embodiment in a state where a leading boost lever is located at its stop position.
Figure 6B:
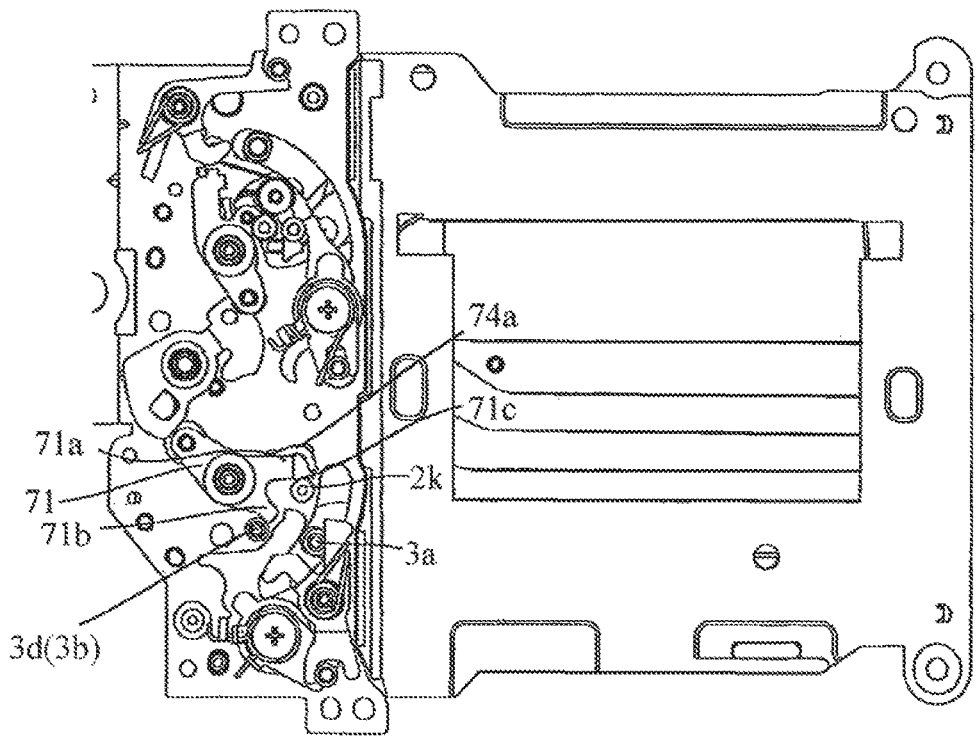

FIGS. 6A and 6B illustrate a state where, after the leading drive lever 3 whose engagement with the leading clamp lever 5 is released starts its rotation integral with the leading boost lever 71 in the clockwise direction, the leading drive lever 3 has reached a rotation position at which the leading boost lever 71 contacts the boss 2k. Until this state the leading boost lever 71 provides the rotating force to the leading drive lever 3, and after this state the leading boost lever 71 provides no rotating force to the leading drive lever 3.

Figure 7A:
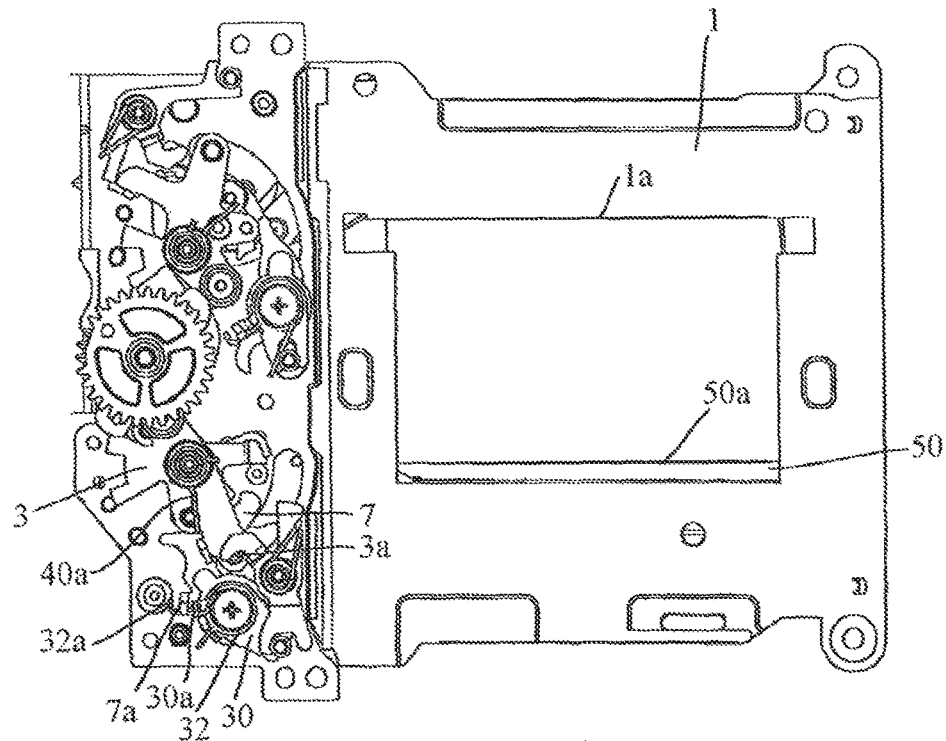
FIGS. 7A and 7B illustrate the focal-plane shutter of the embodiment in a state where a leading curtain drive pin and a leading brake lever contact each other.
Figure 7B:
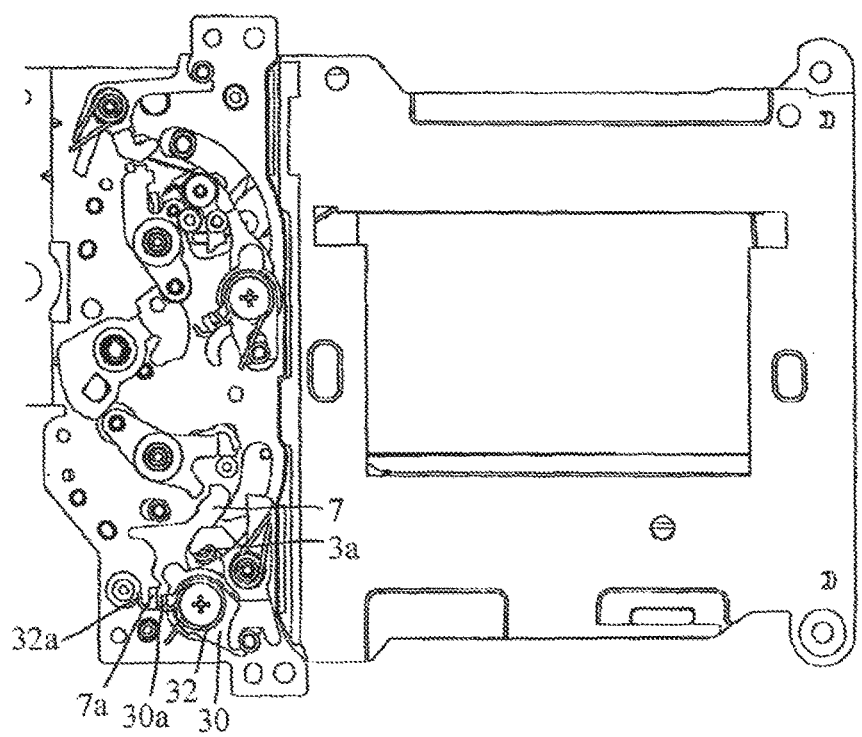

FIGS. 7A and 7B illustrate a state where the leading drive lever 3 further rotates in the clockwise direction from the state of FIGS. 6A and 6B and the leading curtain drive pin 3a is in contact with the leading brake lever 7. The leading brake lever 7 is still located at the same position as that in FIGS. 6A and 6B and the movable end 32a of the leading brake return spring 32 engages with (stays on) the spring engagement portion 30a of the leading brake fixing plate 30, so that the leading brake lever 7 is not biased by the spring force of the leading brake return spring 32.

Figure 8A:
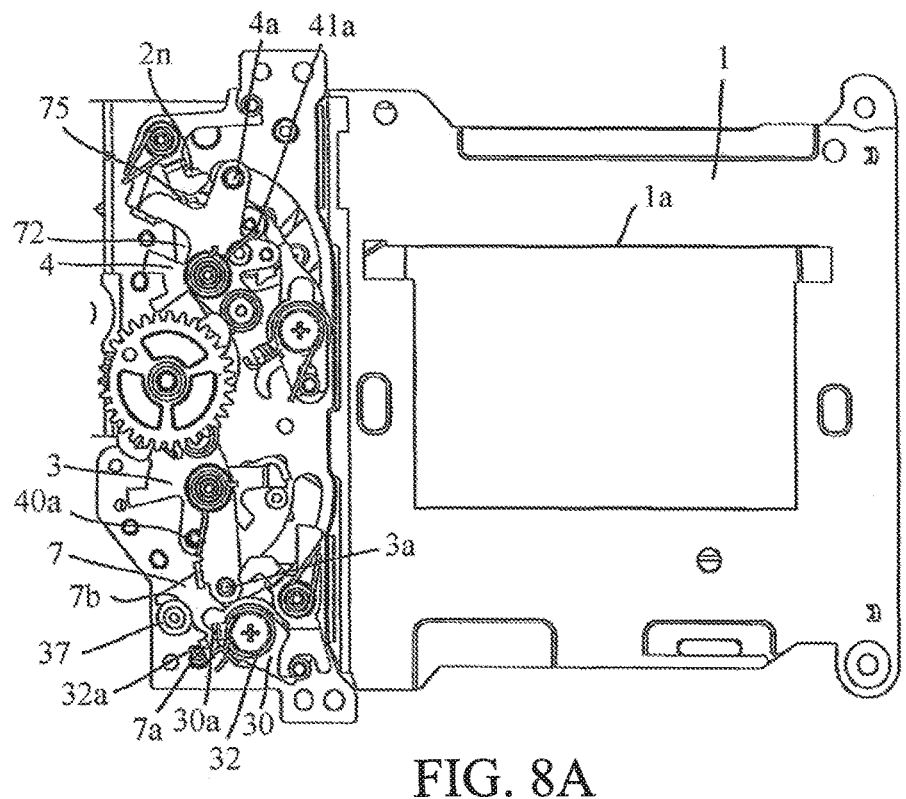
FIGS. 8A and 8B illustrate the focal-plane shutter of the embodiment in its leading curtain movement completion state.
Figure 8B:
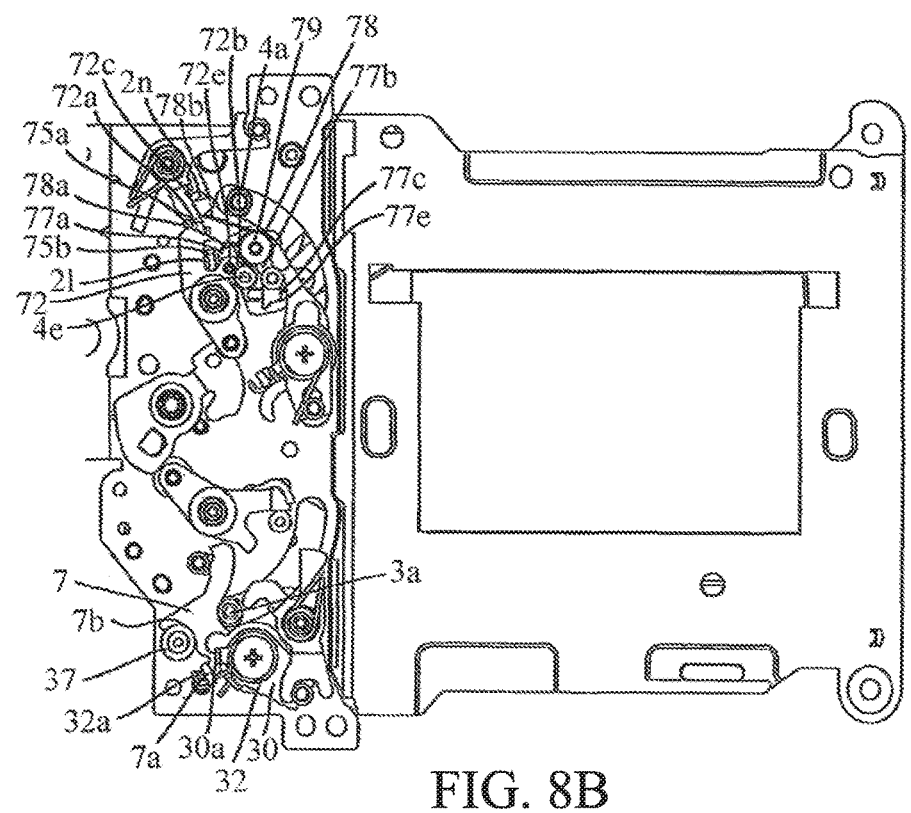

FIGS. 8A and 8B illustrate the movement completion state of the leading curtain unit 50. The leading drive lever 3 rotates in the clockwise direction further from the state of FIGS. 7A and 7B and thereby the leading brake lever 7 is rotated in a counter clockwise direction. Then, a stopper contact portion 7b of the leading brake lever 7 contacts the leading brake stopper rubber 37 and thereby the rotation of the leading brake lever 7 is stopped.

From the state of FIGS. 7A and 7B to the movement completion state of FIGS. 8A and 8B, the movable end 32a of the leading brake return spring 32 having engaged with the spring engagement portion 30a of the leading brake fixing plate 30 in turn engages with the spring engagement portion 7a of the leading brake lever 7. That is, engagement switching of the movable end 32a of the leading brake return spring 32 from the spring engagement portion 30a to the spring engagement portion 7a is performed. In the movement completion state, the leading brake return spring 32 is charged by a predetermined amount. While the movable end 32a of the leading brake return spring 32 engages with the spring engagement portion 30a of the leading brake fixing plate 30, the leading drive lever 3 and the leading curtain unit 50 are reduced in speed only by an action of the leading brake lever 7. This speed reduction is caused mainly by the frictional force generated between the leading brake lever 7 and the brake sheets 34.

However, after the engagement switching of the movable end 32a of the leading brake return spring 32 from the spring engagement portion 30a of the leading brake fixing plate 30 to the spring engagement portion 7a of the leading brake lever 7, the leading brake return spring 32 also acts to reduce the speed of the leading drive lever 3 and the leading curtain unit 50. In addition, with this operation, the leading brake return spring 32 accumulates its elastic energy. As described above, increasing the spring force of the leading brake return spring 32 increases the recovered energy amount. That is, this embodiment enables decreasing, of motion energy converted from the biasing forces of the leading main spring 40 and the leading boost spring 74, a ratio of energy converted into heat energy difficult to be recovered by the brake sheet 34 as a friction sheet and increasing a ratio of energy converted into recoverable elastic energy.

On the other hand, a conventional configuration in which the leading brake return spring acts in the entire rotatable range of the leading brake lever needs to set its spring force, in order to prevent the leading brake lever from being rotated by that spring force, to such a magnitude that it does not overcome the frictional force.

On the other hand, this embodiment employs the configuration that becomes a state where the leading brake return spring 32 does not act on the leading brake lever 7 located at the standby position. This configuration enables eliminating limitations on the spring force of the leading brake return spring 32 and thereby enables increasing the spring force thereof as compared to that of the conventional configuration.

Furthermore, this embodiment sets a switch position at which a state where the leading brake return spring 32 acts on the leading brake lever 7 and a state where that spring 32 does not act thereon are switched to a position corresponding to after the slit-forming portion 50a of the leading curtain unit 50 reaches outside the aperture, so that the return of the slit-forming portion 50a of the leading curtain unit 50 into the aperture due to the bounce, which may be caused by an increase of the spring force of the leading brake return spring 32, is hardly caused.

As described later, the elastic energy charged in the leading brake return spring 32 is used as energy for the return to the standby state.

Figure 9A:
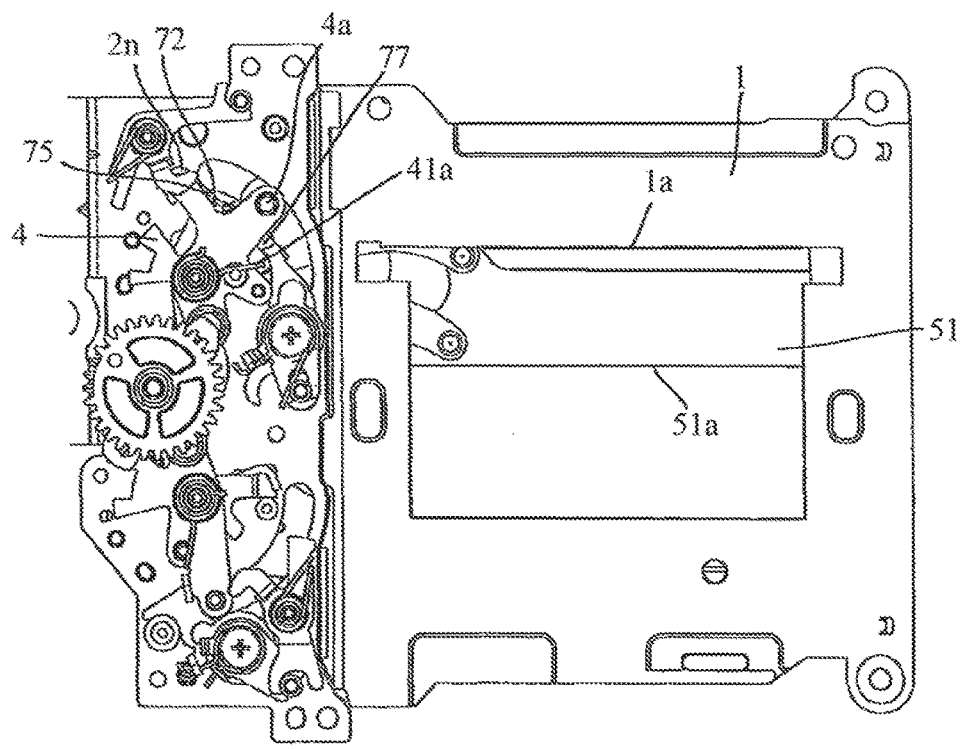
FIGS. 9A and 9B illustrate the focal-plane shutter of the embodiment in a state where a trailing boost lever is located at its stop position.
Figure 9B:
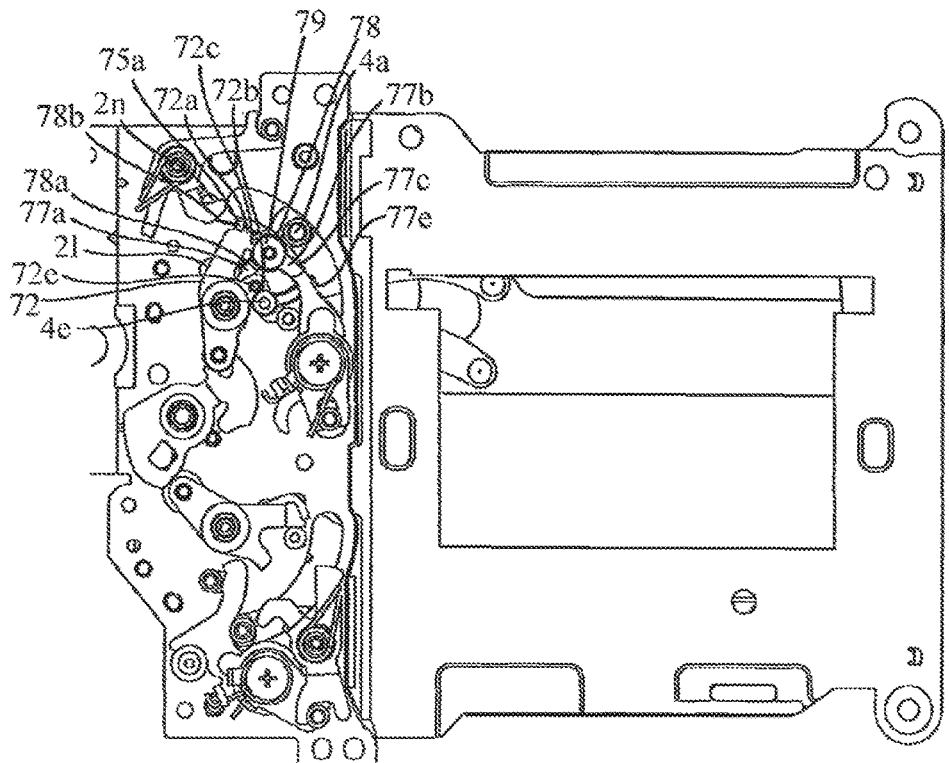

FIGS. 9A and 9B illustrate a state where, after the trailing drive lever 4 whose engagement with the trailing clamp lever 6 is released starts its rotation integral with the trailing boost lever 72 in the clockwise direction, the trailing drive lever 4 has reached a rotation position at which the trailing boost lever 72 contacts the stopper 79. Until this state the trailing boost lever 72 provides the rotating force to the trailing drive lever 4, and after this state the trailing boost lever 72 provides no rotating force to the trailing drive lever 4. The lock lever 77 rotates with the rotation of the unlock pin 72e of the trailing boost lever 72 in the counter clockwise direction and thereby the first cam surface 77c and the stopper surface 77e reach the lock position where the these surfaces 77c and 77e enter the rotatable area of the trailing curtain drive pin 4a.

Figure 10A:
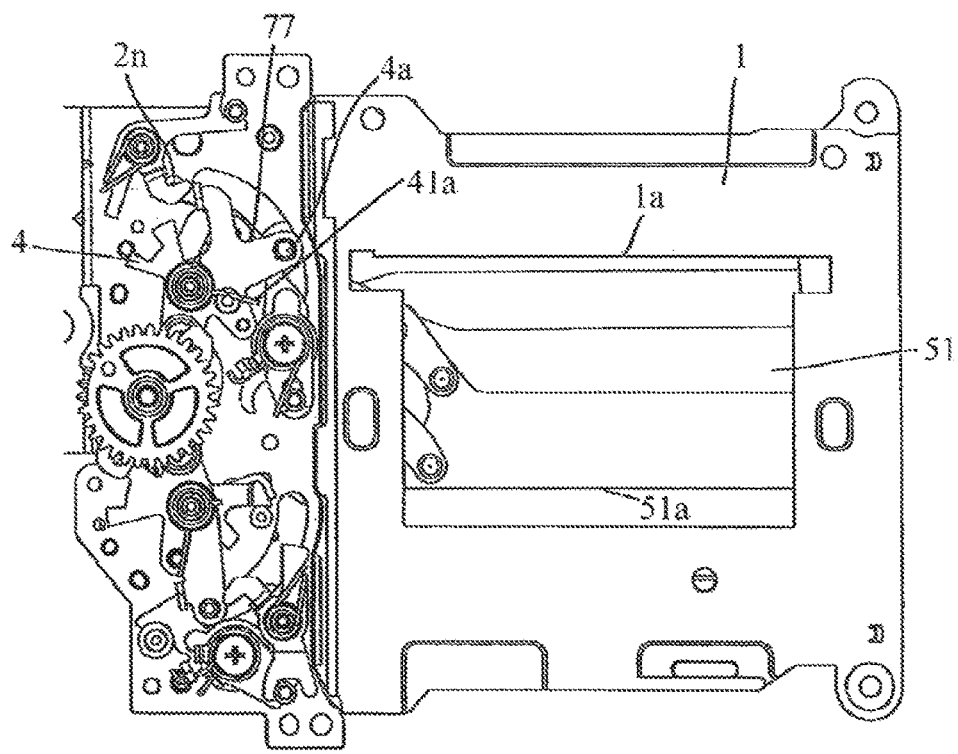
FIGS. 10A and 10B illustrate the focal-plane shutter of the embodiment in a state where a trailing curtain drive pin and the lock lever contact each other.
Figure 10B:
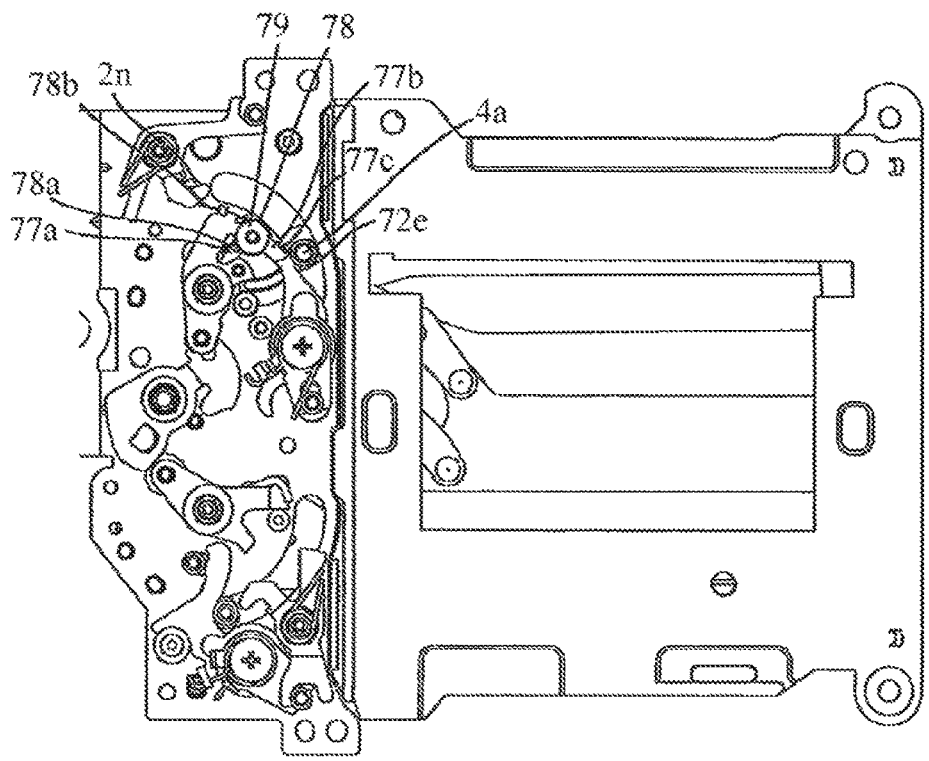

FIGS. 10A and 10B illustrate a state where the trailing drive lever 4 further rotates in the clockwise direction from the state of FIGS. 9A and 9B and the trailing curtain drive pin 4a is in contact with the first cam surface 77c of the lock lever 77.

Figure 11A:
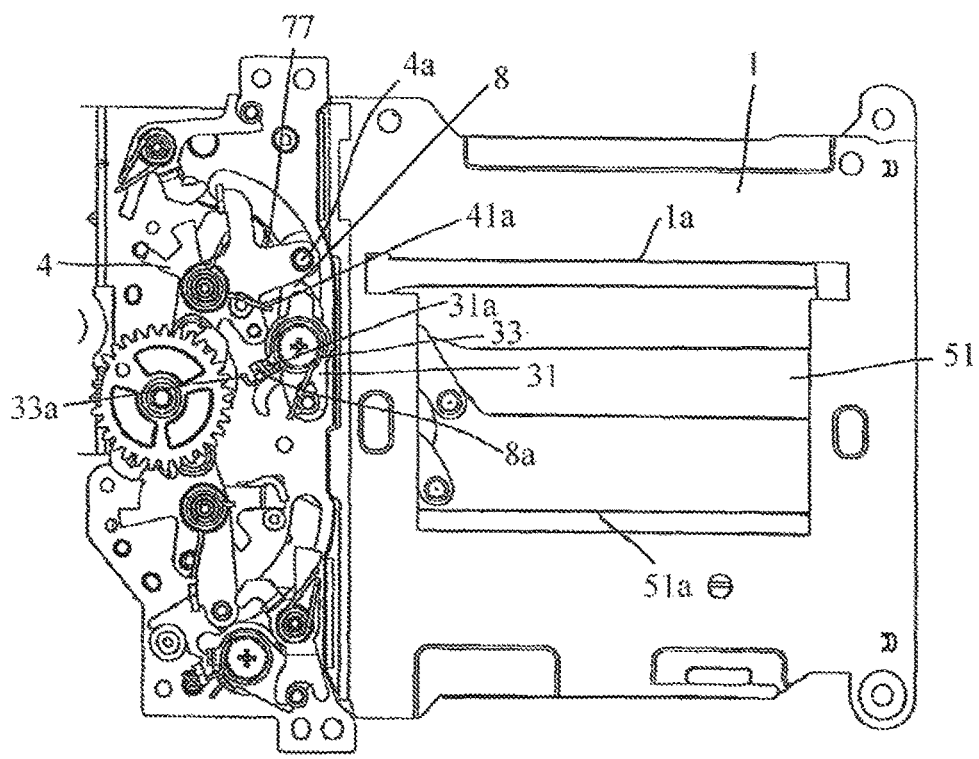
FIGS. 11A and 11B illustrate the focal-plane shutter of the embodiment in a state where the trailing curtain drive pin and a trailing brake lever contact each other.
Figure 11B:
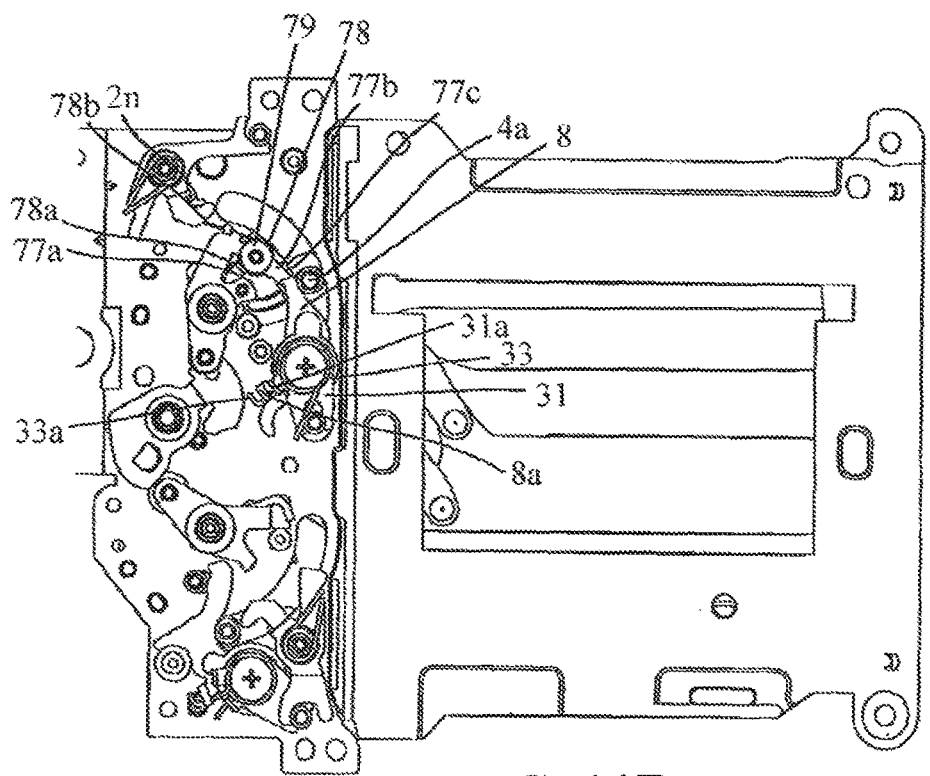

FIGS. 11A and 11B illustrate a state where the trailing drive lever 4 further rotates in the clockwise direction from the state of FIGS. 10A and 10B and the trailing curtain drive pin 4a is in contact with the trailing brake lever 8. The trailing brake lever 8 is still located at the same position as that in FIGS. 10A and 10B and the movable end 33a of the trailing brake return spring 33 engages with (stays on) the spring engagement portion 31a of the trailing brake fixing plate 31, so that the trailing brake lever 8 is not biased by the spring force of the trailing brake return spring 33.

Figure 12A:
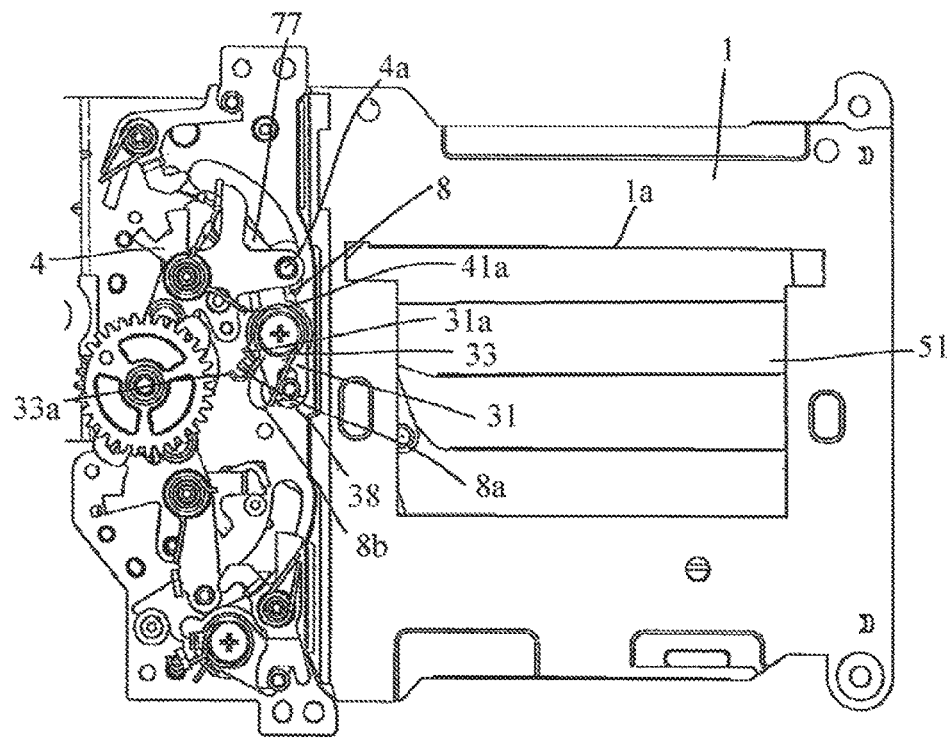
FIGS. 12A and 12B illustrate the focal-plane shutter of the embodiment in a state where the lock lever is located at its lock position.
Figure 12B:
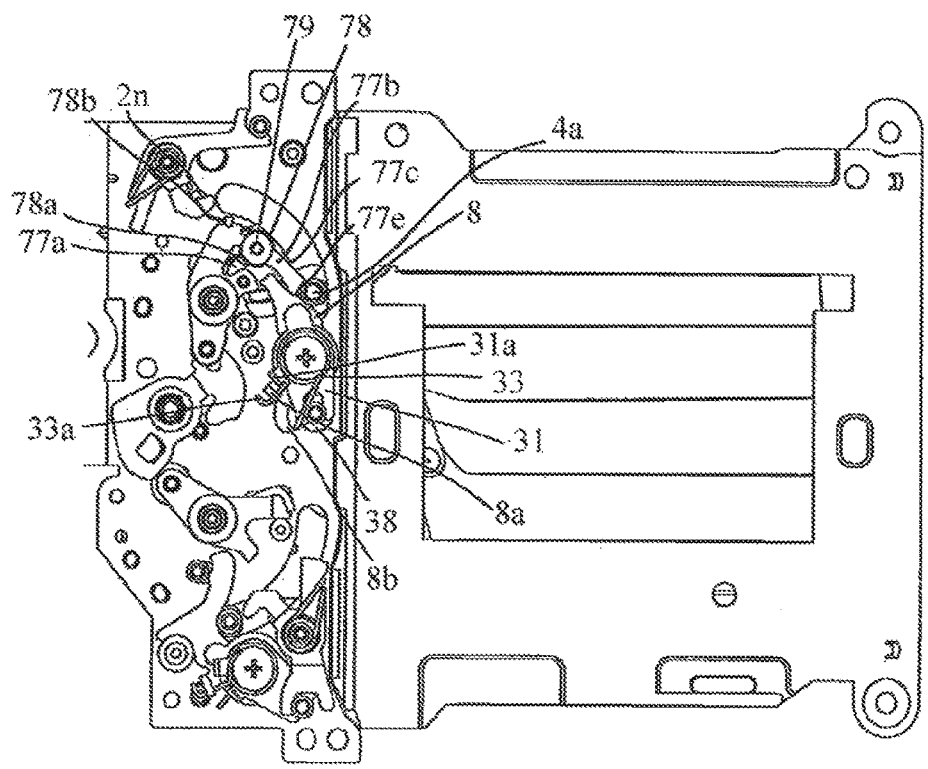

FIGS. 12A and 12B illustrate a state where, after the lock lever 77 is once rotated toward the unlock position by the trailing curtain drive pin 4a of the trailing drive lever 4 further rotating in the clockwise direction from the state of FIGS. 11A and 11B, the lock lever 77 has returned to the lock position by the biasing force of the lock spring 78. After this state, as illustrated in FIG. 12B, the stopper surface 77e of the lock lever 77 is located in the rotatable area of the trailing curtain drive pin 4a, which can prevent the trailing drive lever 4 bouncing with respect to the trailing brake lever 8 from returning in the counter clockwise direction.

Figure 13A:
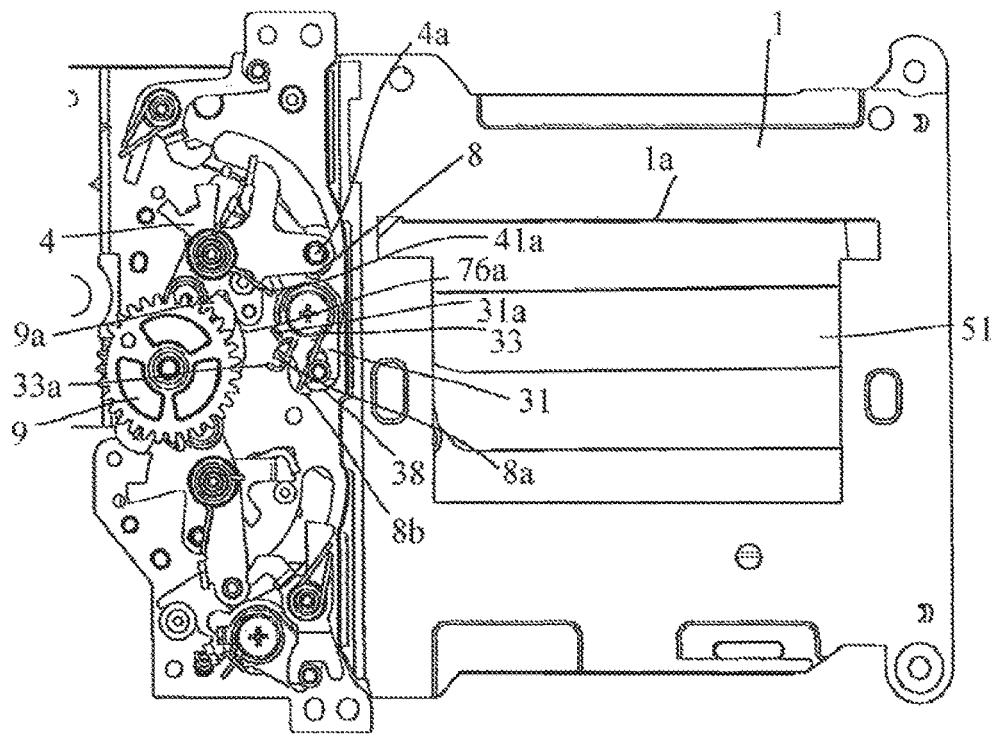
FIGS. 13A and 13B illustrate the focal-plane shutter of the embodiment in its trailing curtain movement completion state.
Figure 13B:
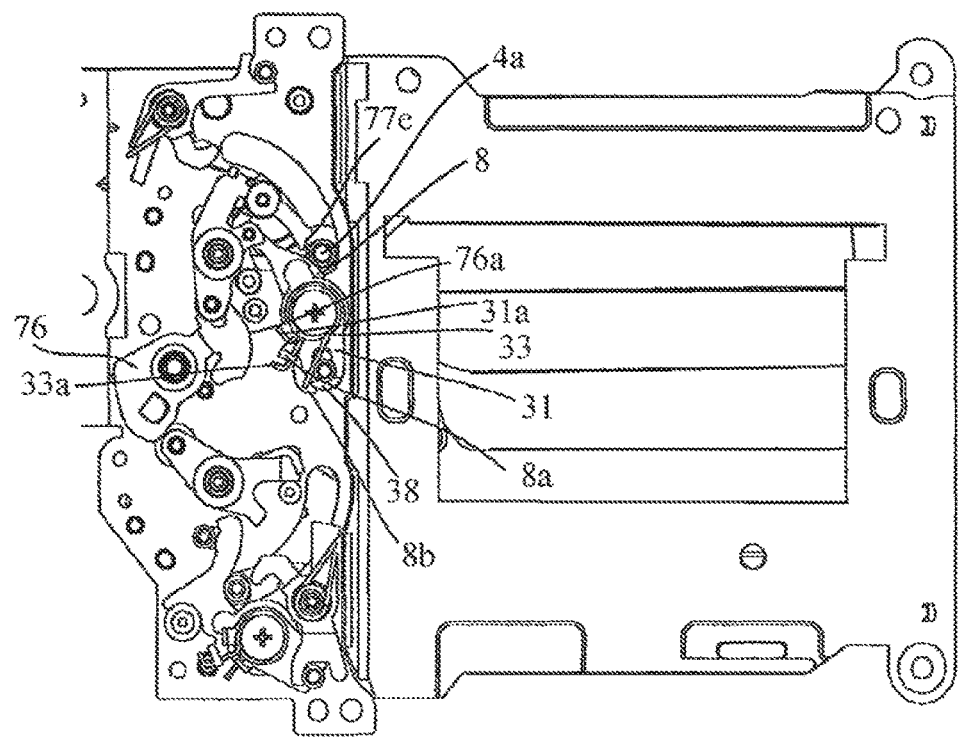

FIGS. 13A and 13B illustrate the movement completion state of the trailing curtain unit 51. The trailing drive lever 4 further rotating in the clockwise direction from the state of FIGS. 12A and 12B causes the trailing brake lever 8 to rotate in the counter clockwise direction. Then, a stopper contact portion 8b of the trailing brake lever 8 contacts the trailing brake stopper rubber 38 to stop the rotation of the trailing brake lever 8. In this state, the motion energy of the trailing drive lever 4 and the trailing curtain unit 51 cannot be absorbed by only one action of the trailing brake mechanism, and therefore after the rotation of the trailing brake lever 8 is stopped, the trailing drive lever 4 bounces in the counter clockwise direction.

Conventionally, in order to prevent the slit-forming portion 51a of the trailing curtain unit 51 from returning into the aperture 1a, the trailing brake mechanism is required to have a sufficiently increased energy absorption effect. This also applies to the leading brake mechanism.

On the other hand, this embodiment uses, in addition to the trailing brake mechanism (energy absorption mechanism) including the trailing brake lever 8, a lock mechanism (bounce reduction mechanism) including the lock lever 77 to prevent the return of the slit-forming portion 51a of the trailing curtain unit 51 into the aperture 1a. In other words, even when the bounce of the trailing drive lever 4 cannot be sufficiently reduced only by the trailing brake mechanism, the lock lever 77 (stopper surface 77e) located in the rotatable area of the trailing curtain drive pin 4a at the time when the bounce is caused receives contact of the trailing curtain drive pin 4a to prevent further return of the trailing drive lever 4.

In the configuration of the trailing brake mechanism (and the leading brake mechanism) employed in this embodiment, as a number of times of release operations increases, a surface of each brake sheet 34 is further worn away, which may decrease the energy absorption effect with decrease of the frictional force generated thereon. Thus, when the lock mechanism is not provided, the braking force needs to be set also with consideration of the decrease of the energy absorption effect.

However, simply increasing the frictional force generated by the brake sheet 34 so as to compensate the decrease of the energy absorption effect may stop the rotation of the trailing drive lever 4 before the slit-forming portion 51a reaches outside the aperture 1a. Furthermore, increasing the frictional force increases a load of the charge motor 12 for charging the trailing drive lever 4 against a large frictional force generated by the brake sheets 34.

On the other hand, this embodiment sets the frictional force generated on the brake sheet 34, for example, so as to prevent a bounce of the trailing drive lever 4 whose amplitude causes the trailing curtain drive pin 4a to contact the stopper surface 77e of the lock lever 77 in an initial use state in which the number of times of the release operations is small and so as to allow the trailing curtain drive pin 4a to contact the stopper surface 77e when the amplitude of the bounce becomes large due to a decrease of the frictional force generated on the brake sheet 34 with an increase of the number of times of the release operation. This setting enables improving durability of the shutter against the re-exposure due to the bounce without setting the frictional force generated on the brake sheet 34.

Although this embodiment provides the lock lever 77 for the trailing drive lever 4, a similar lock lever may be provided for the leading drive lever 3.

From the state of FIGS. 11A and 11B to the state of FIGS. 12A and 12B, the movable end 33a of the trailing brake return spring 33 having engaged with the spring engagement portion 31a of the trailing brake fixing plate 31 in turn engages with the spring engagement portion 8a of the trailing brake lever 8. Then, in the movement completion state illustrated in FIGS. 13A and 13B, the trailing brake return spring 33 is charged by a predetermined amount. While the movable end 33a of the trailing brake return spring 33 engages with the spring engagement portion 31a of the trailing brake fixing plate 31, the trailing drive lever 4 and the trailing curtain unit 51 are reduced in speed only by an action of the trailing brake lever 8. This speed reduction is caused mainly by the frictional force generated between the trailing brake lever 8 and the brake sheets 34.

However, after the above engagement switching of the movable end 33a of the trailing brake return spring 33 from the spring engagement portion 31a of the trailing brake fixing plate 31 to the spring engagement portion 8a of the trailing brake lever 8, the trailing brake return spring 33 also acts to reduce the speed of the trailing drive lever 4 and the trailing curtain unit 51. In addition, with this operation, the trailing brake return spring 33 accumulates its elastic energy. The engagement switching of the movable end 33a of the trailing brake return spring 33 from the spring engagement portion 31a to the spring engagement portion 8a provides the same effect as that provided by the engagement switching of the movable end 32a of the leading brake return spring 32 from the spring engagement portion 30a to the spring engagement portion 7a.

Next, with referring to FIGS. 14A and 14B to FIGS. 20A and 20B, description will be made of the charge operation from the movement completion state to the movement standby state. After a predetermined time has elapsed from the movement completion state illustrated in FIGS. 13A and 13B, the charge motor 12 is energized and thereby the charge cam gear 9 starts its rotation in the clockwise direction.

Figure 14A:
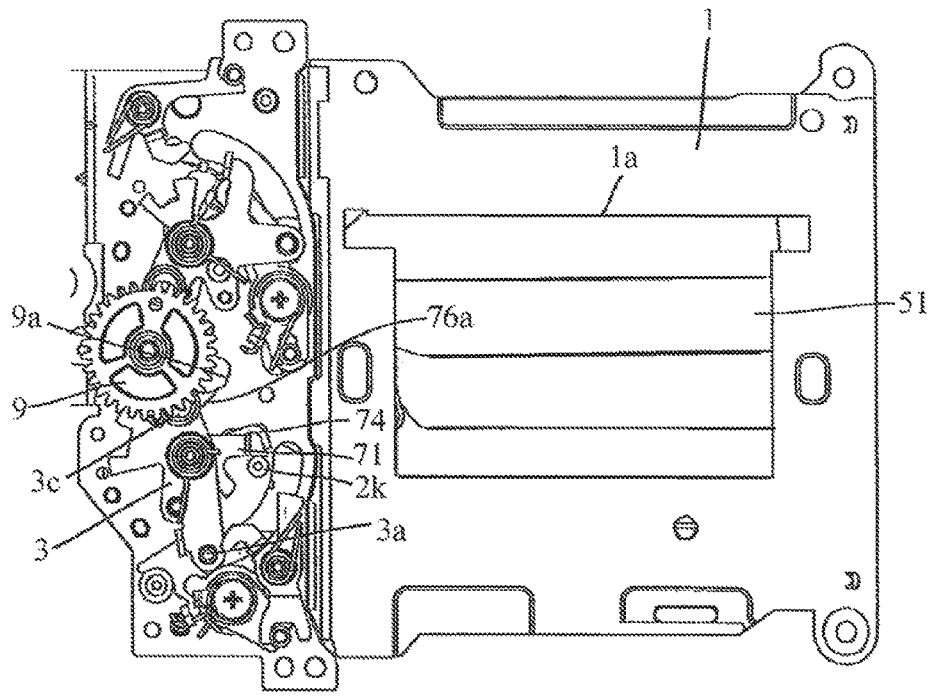
FIGS. 14A and 14B illustrate the focal-plane shutter of the embodiment in a state where a charge operation of a leading drive lever is started.
Figure 14B:
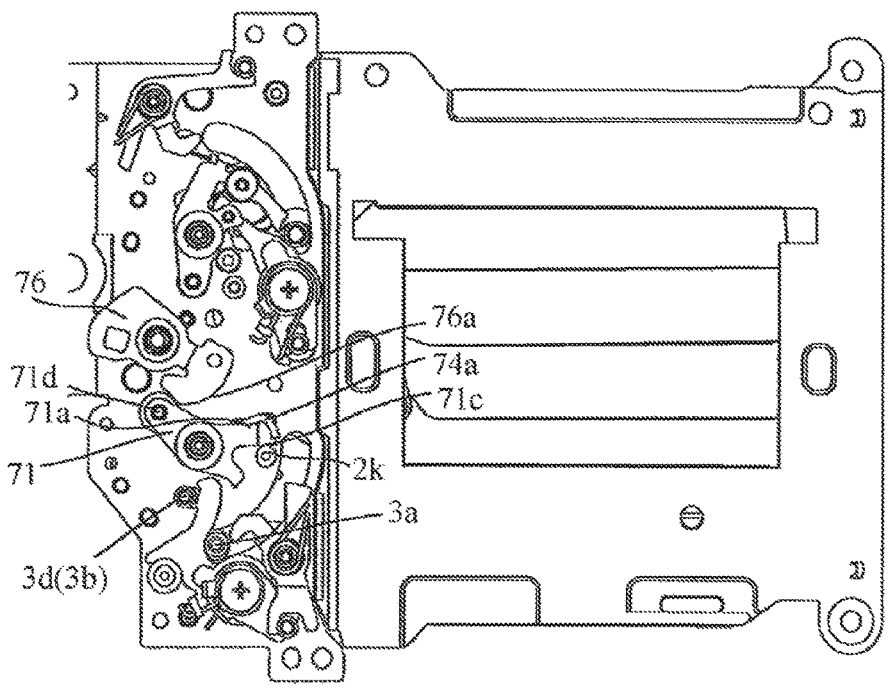

FIGS. 14A and 14B illustrate a state where the charge cam gear 9 rotates in the clockwise direction from the movement completion state and thereby the leading boost lever 71 and the leading drive lever 3 start their rotations toward their standby positions. In this state, a leading cam 76a of the boost cam 76 is in contact with the roller 71d of the leading boost lever 71 and a leading cam 9a of the charge cam gear 9 is in contact with the roller 3c of the leading drive lever 3. After this state, the leading boost spring 74 is charged by a counter clockwise rotation of the leading boost lever 71, and the leading main spring 40 is charged by a counter clockwise rotation of the leading drive lever 3.

In the movement completion state, the leading drive lever 3 biased by the biasing force of the leading main spring 40 biases, via the leading curtain drive pin 3a, the leading brake lever 7 in the counter clockwise direction. on the other hand, in the charge operation, the leading drive lever 3 starts its rotation toward the standby position before the leading brake lever 7 starts its rotation, which forms a gap between the leading curtain drive pin 3a and the leading brake lever 7 and thereby no biasing force acts on the leading brake lever 7. Thus, the leading brake lever 7 allows the leading brake return spring 32 to release its accumulated elastic energy.

This embodiment sets, in the movement completion state, a total of a frictional torque generated on the brake sheets 34 in the leading brake mechanism and a biasing torque generated by the biasing force by which the leading main spring 40 pushes the leading brake lever 7 via the leading curtain drive pin 3a to be larger than a spring torque generated by the leading brake return spring 32. Furthermore, this embodiment sets, in the movement completion state, the spring torque generated by the leading brake return spring 32 to be larger than the frictional torque generated on the brake sheets 34. With these settings, the leading brake lever 7 is not rotated in the movement completion state, and however, after the leading drive lever 3 starts its rotation toward the standby position, the leading brake lever 7 starts its clockwise rotation.

Figure 15A:
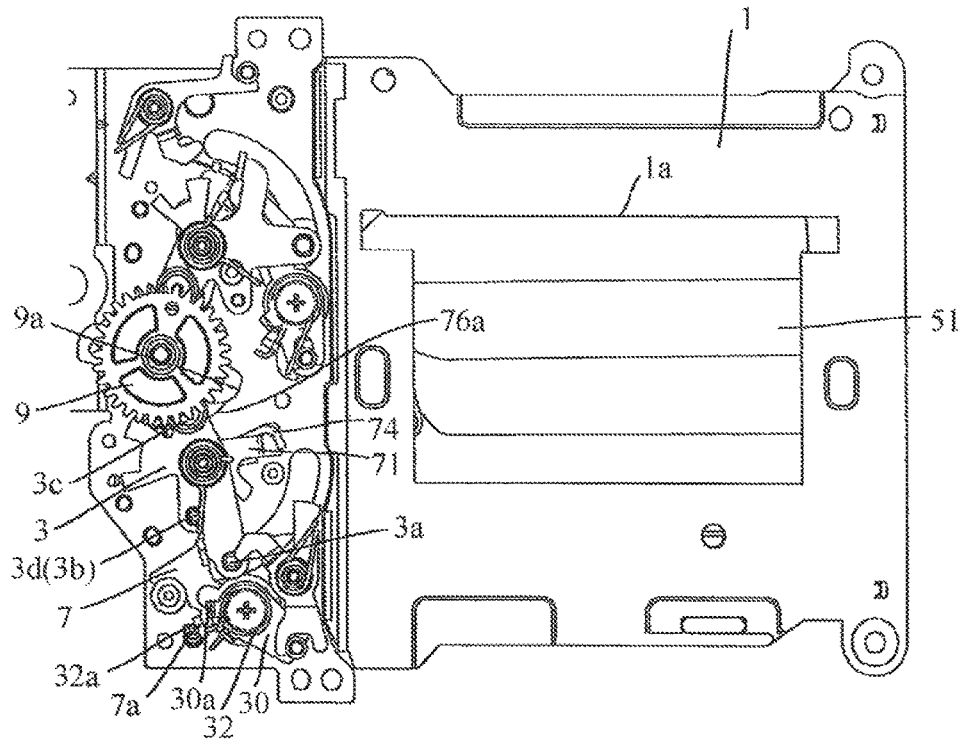
FIGS. 15A and 15B illustrate the focal-plane shutter of the embodiment in a state where a charge operation of the leading brake lever is started.
Figure 15B:
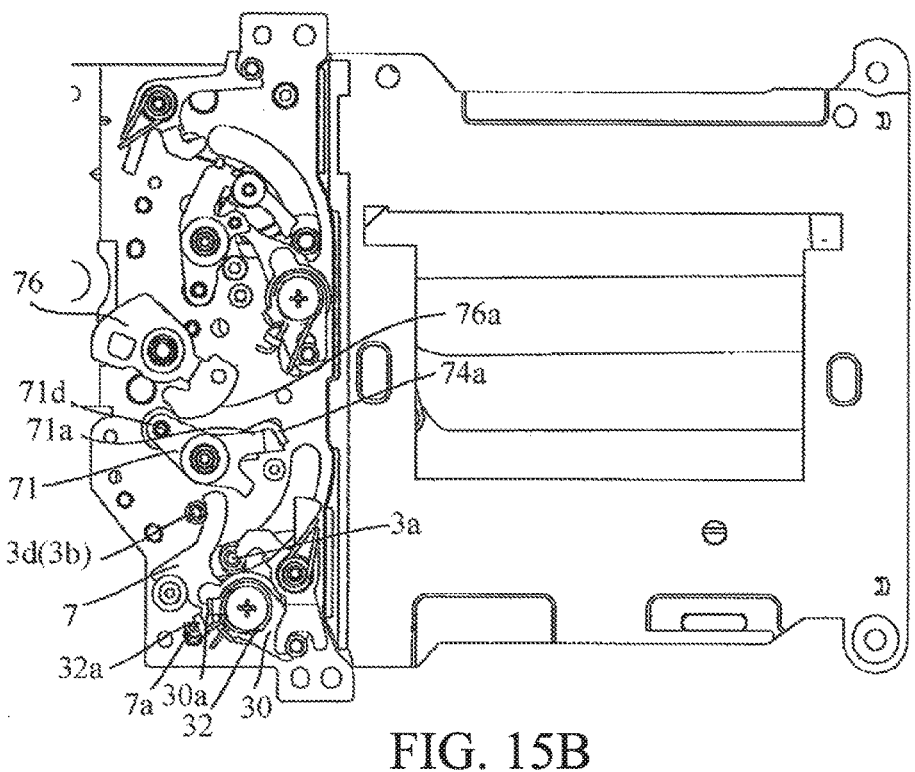

FIGS. 15A and 15B illustrate a state where the charge cam gear 9 further rotates from the state of FIGS. 14A and 14B and the leading brake lever 7 is about to start its rotation toward the standby position. The leading cam 9a rotates the leading drive lever 3 in the counter clockwise direction from the state of FIGS. 14A and 14B and thereby the leading brake charge pin 3b of the leading drive lever 3 catches up with the leading brake lever 7. Thereafter, the leading brake lever 7 continuously rotates toward the standby position in the clockwise direction with the counter clockwise rotation of the leading drive lever 3 and boost thereto by the leading brake return spring 32 also continues.

Figure 16A:
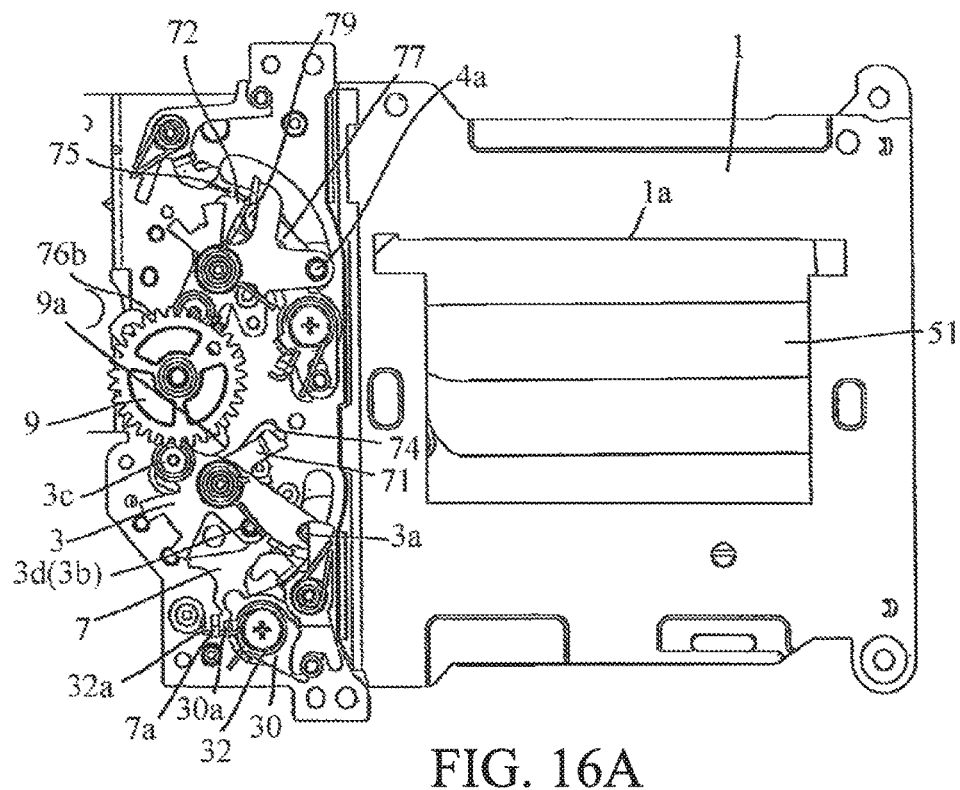
FIGS. 16A and 16B illustrate the focal-plane shutter of the embodiment in a state where a charge operation of the trailing boost lever is started.
Figure 16B:
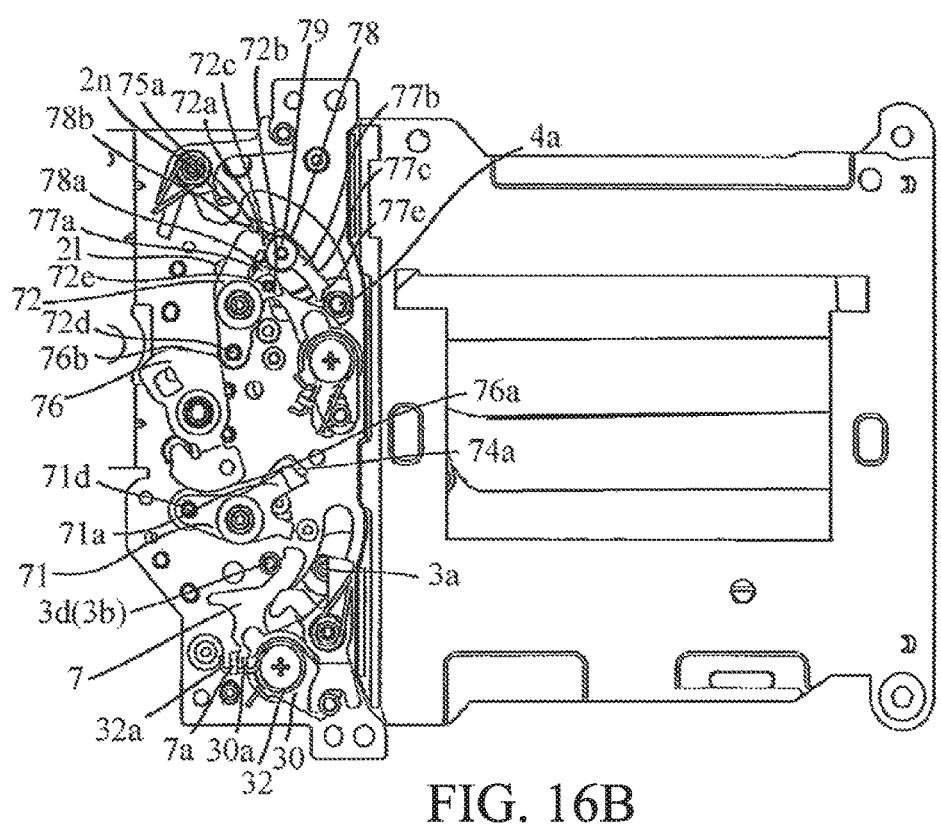

This embodiment sets the spring torque generated by the leading brake return spring 32 such that, at a time immediately before engagement switching of the movable end 32a of the leading brake return spring 32 to the spring engagement portion 30a of the leading brake fixing plate 30 is performed as illustrated in FIGS. 16A and 16B, the spring torque of the leading brake return spring 32 becomes smaller than the frictional torque generated on the brake sheets 34. The time immediately before the engagement switching of the movable end 32a to the spring engagement portion 30a corresponds to a time immediately before the slit-forming portion 50a of the leading curtain unit 50 reaches an upper end of the aperture 1a. This setting prevents more surely the return of the slit-forming portion 50a into the aperture 1a during the charge operation.

However, the spring force of the leading brake return spring 32 may be larger so as to return only thereby the leading brake lever 7 to the standby position. This setting enables further decreasing a torque required for the charge motor 12.

FIGS. 16A and 16B illustrate a state where the charge cam gear 9 further rotates from the state of FIGS. 15A and 15B and the trailing boost lever 72 and the lock lever 77 are about to start their rotations toward their standby positions. In this state, a trailing cam 76b of the boost cam 76 is in contact with the roller 72a of the trailing boost lever 72.

After this state, the trailing boost spring 75 is charged by a counter clockwise rotation of the trailing boost lever 72. With this charge of the trailing boost spring 75, the unlock pin 72e of the trailing boost lever 72 pushes and rotates the lock lever 77 in the clockwise direction while being in contact with (while sliding with respect to) the second cam surface 77d of the lock lever 77. The lock lever 77 rotating in the clockwise direction charges the lock spring 78 and thereby its arm 77b (that is, the first cam surface 77c and the stopper surface 77e) moves toward outside of the rotatable area of the trailing curtain drive pin 4a.

Figure 17A:
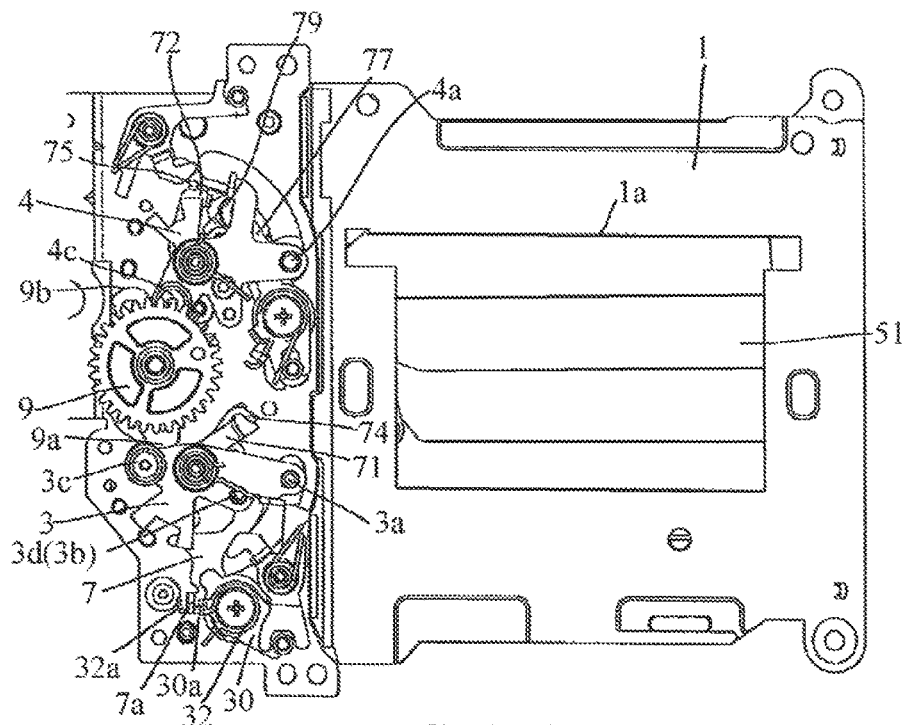
FIGS. 17A and 17B illustrate the focal-plane shutter of the embodiment in a state where a charge operation of a trailing drive lever is started.
Figure 17B:
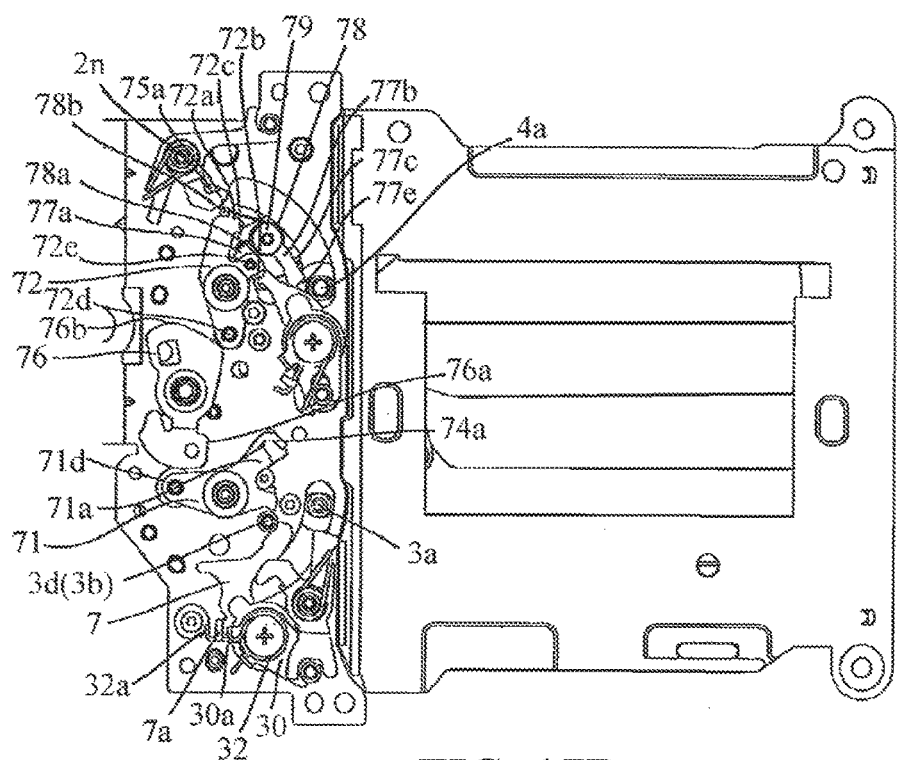

FIGS. 17A and 17B illustrate a state where the charge cam gear 9 further rotates from the state of FIGS. 16A and 16B and the trailing drive lever 4 is about to start its counter clockwise rotation toward its standby position. In this state, a trailing cam 9b of the charge came gear 9 is in contact with the roller 4c of the trailing drive lever 4. Furthermore, in this state, the lock lever 77 has already returned to the unlock position and the first cam surface 77c and the stopper surface 77e has already completely moved outside the rotatable area of the trailing curtain drive pin 4a, which allows the return of the trailing drive lever 4 to the standby position.

As described above, in the charge operation in this embodiment, the trailing boost lever 72 rotates the lock lever 77 from the lock position to the unlock position before the start of the rotation of the trailing drive lever 4. This charge operation enables smooth return of the trailing drive lever 4 to the standby position (that is, a position corresponding to before the start of the movement of the trailing curtain unit 51). Thereafter, the trailing main spring 41 is charged by the counter clockwise rotation of the trailing drive lever 4.

In the movement completion state, the trailing drive lever 4 biased by the biasing force of the trailing main spring 41 biases, via the trailing curtain drive pin 4a, the trailing brake lever 8 in the counter clockwise direction. On the other hand, in the charge operation, the trailing drive lever 4 starts its rotation toward the standby position before the trailing brake lever 8 starts its rotation, which forms a gap between the trailing curtain drive pin 4a and the trailing brake lever 8 and thereby no biasing force acts on the trailing brake lever 8. Thus, the trailing brake lever 8 allows the trailing brake return spring 33 to release its accumulated elastic energy.

This embodiment sets, in the movement completion state, a total of a frictional torque generated on the brake sheets 34 in the trailing brake mechanism and a biasing torque generated by the biasing force by which the trailing main spring 41 pushes the trailing brake lever 8 via the trailing curtain drive pin 4a to be larger than a spring torque generated by the trailing brake return spring 33. Furthermore, this embodiment sets, in the movement completion state, the spring torque generated by the trailing brake return spring 33 to be larger than the frictional torque generated on the brake sheets 34. With these settings, the trailing brake lever 8 is not rotated in the movement completion state, and however, after the trailing drive lever 4 starts its rotation toward the standby position, the trailing brake lever 8 starts its clockwise rotation.

On the other hand, at this time, the leading drive lever 3 has returned near the standby position, and the leading brake lever 7 has also returned near the standby position. As described above, the engagement switching of the movable end 32a of the leading brake return spring 32 from the spring engagement portion 7a of the leading brake lever 7 to the spring engagement portion 30a of the leading brake fixing plate 30 has already been done, and thus the spring force of the leading brake return spring 32 does not act on the leading brake lever 7.

Figure 18A:
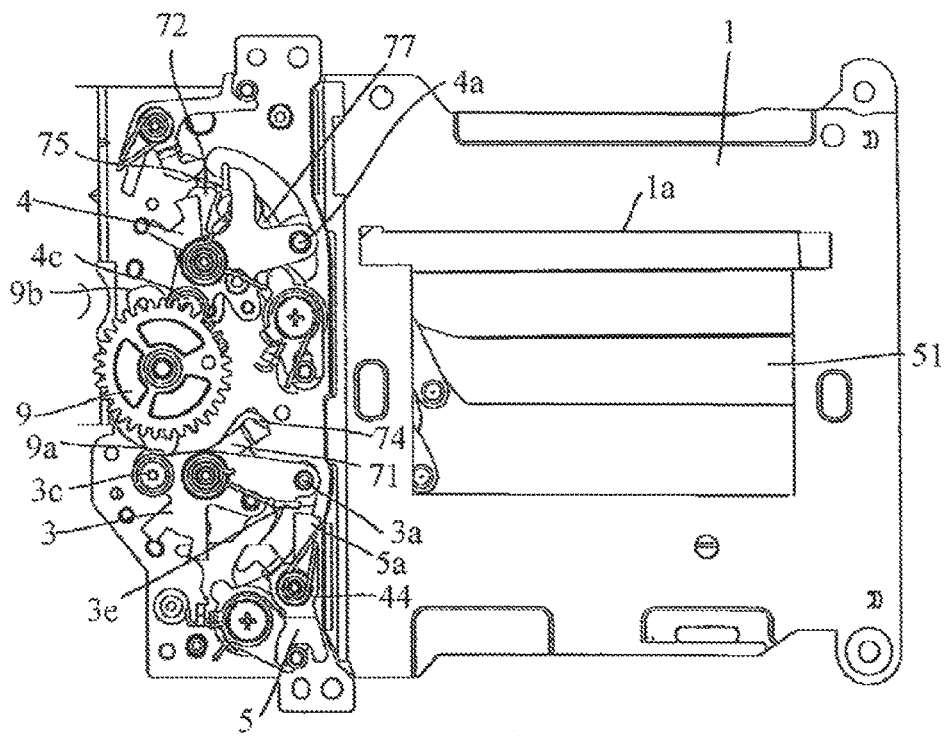
FIGS. 18A and 18B illustrate the focal-plane shutter of the embodiment in a state where the leading drive lever reaches a cam top of a leading cam of a charge cam gear.
Figure 18B:
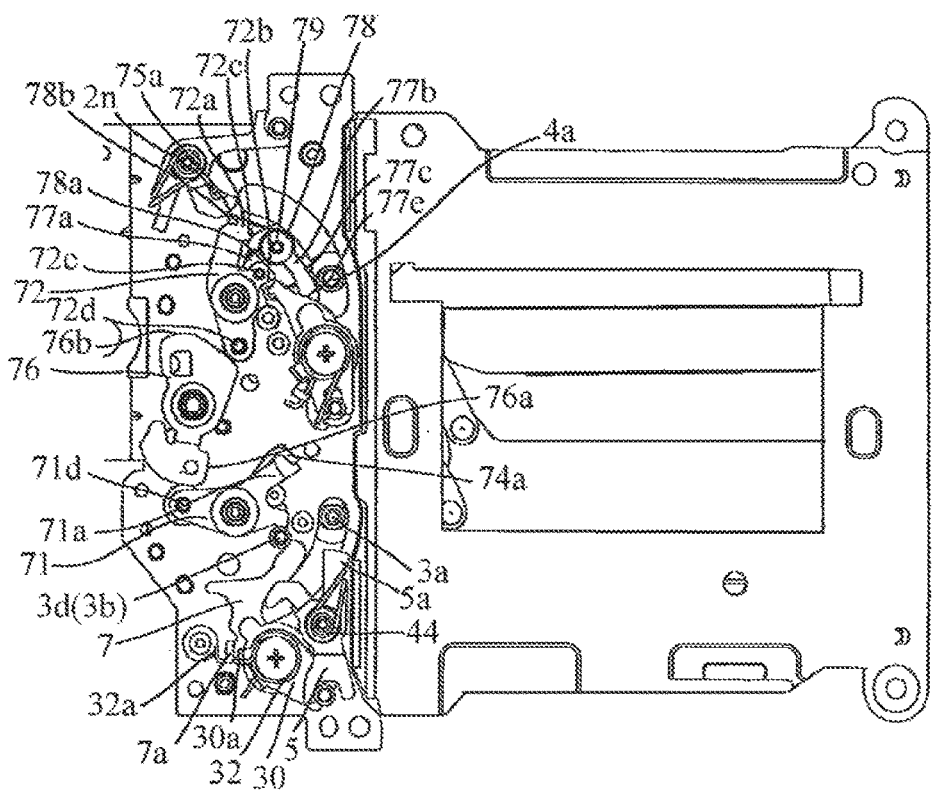

FIGS. 18A and 18B illustrate a state where the charge cam gear 9 further rotates in the clockwise direction from the state of FIGS. 17A and 17B and the leading drive lever 3 has reached a cam top of the leading cam 9a of the charge cam gear 9. The leading drive lever 3 has reached its rotation end position in the counter clockwise direction. The engagement portion 5a of the leading clamp lever 5 is stopped in a rotatable area of the bend portion 3e of the leading drive lever 3 by a biasing force of the leading clamp return spring 44.

Figure 19A:
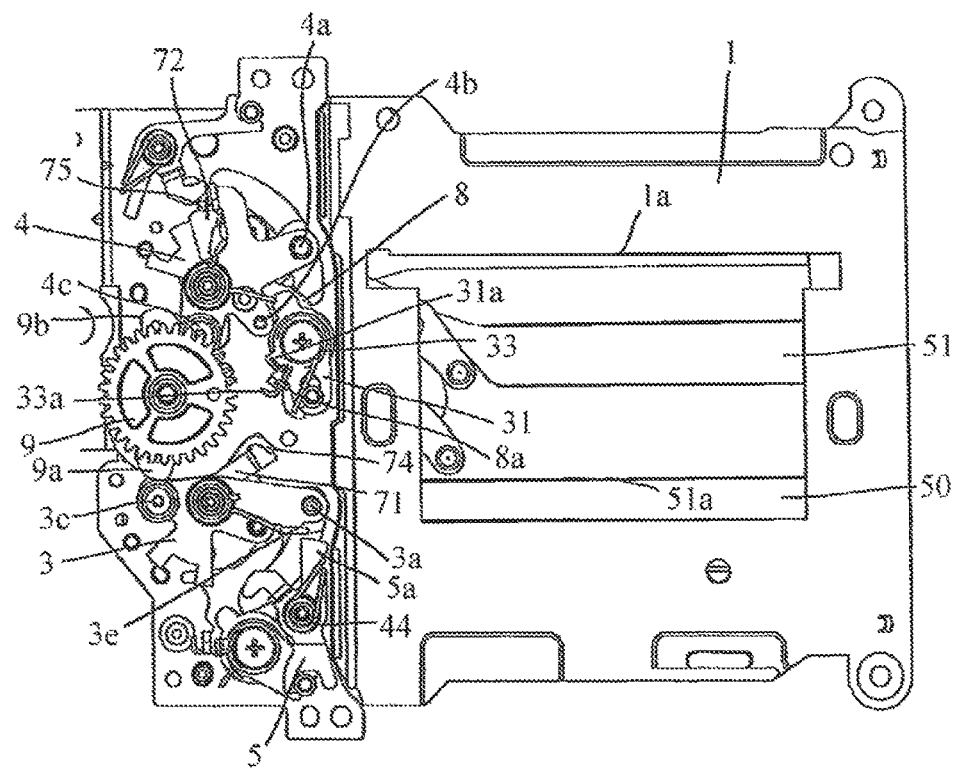
FIGS. 19A and 19B illustrate the focal-plane shutter of the embodiment in a state where a charge operation of the trailing brake lever is started.
Figure 19B:
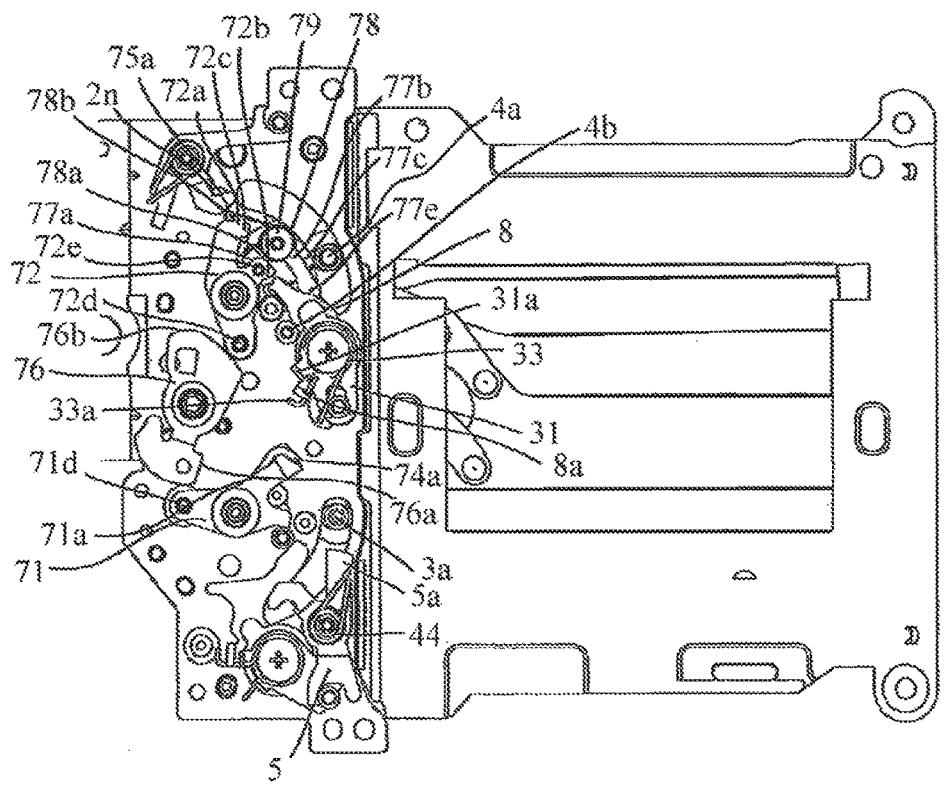

FIGS. 19A and 19B illustrate a state where the charge cam gear 9 further rotates in the clockwise direction from the state of FIGS. 18A and 18B and the trailing brake lever 8 is about to start its rotation toward the standby position. The trailing cam 9b rotates the trailing drive lever 4 in the counter clockwise direction from the state of FIGS. 18A and 18B and thereby the trailing brake charge pin 4b of the trailing drive lever 4 catches up with the trailing brake lever 8. Thereafter, the trailing brake lever 8 continuously rotates toward the standby position in the clockwise direction with the counter clockwise rotation of the trailing drive lever 4 and boost thereto by the trailing brake return spring 33 also continues.

This embodiment sets, as well as for the leading brake return spring 32, the spring torque generated by the trailing brake return spring 33 such that, at a time immediately before the movable end 33a of the trailing brake return spring 33 contacts the spring engagement portion 31a of the trailing brake fixing plate 31, the spring torque becomes smaller than the frictional torque generated on the brake sheets 34. The time immediately before the movable end 33a contacts the spring engagement portion 31a corresponds to a time immediately before the slit-forming portion 51a of the trailing curtain unit 51 reaches the upper end of the aperture 1a. This setting prevents more surely the return of the slit-forming portion 51a into the aperture 1a during the charge operation.

However, the spring force of the trailing brake return spring 33 may be larger so as to return only thereby the trailing brake lever 8 to the standby position. This setting enables further decreasing the torque required for the charge motor 12.

Figure 20A:
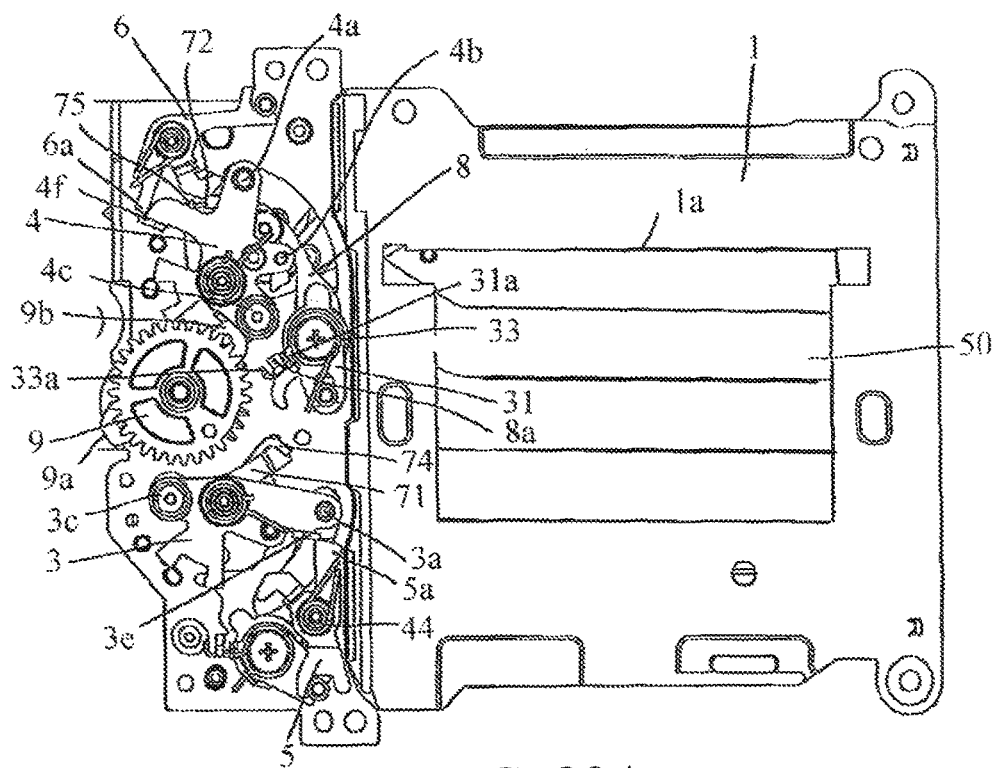
FIGS. 20A and 20B illustrate the focal-plane shutter of the embodiment in a state where the trailing drive lever reaches a cam top of a trailing cam of the charge cam gear.
Figure 20B:
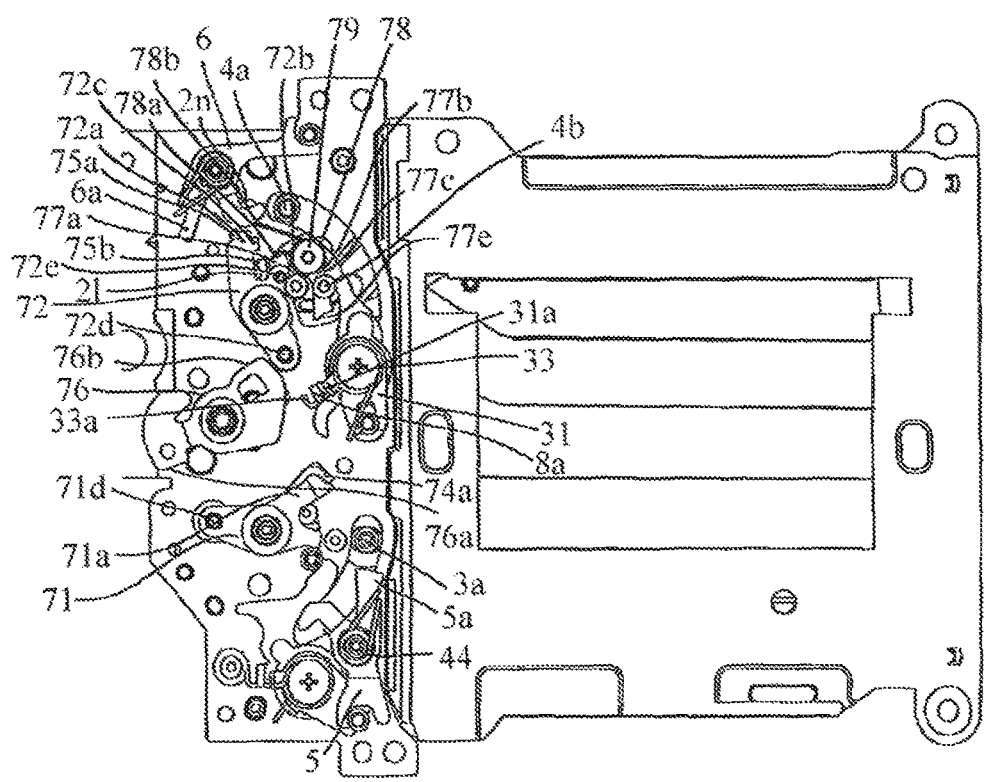

FIGS. 20A and 20B illustrate a state where the charge cam gear 9 further rotates in the clockwise direction from the state of FIGS. 19A and 19B and the trailing drive lever 4 has reached a cam top of the trailing cam 9b of the charge cam gear 9. The trailing drive lever 4 has reached its rotation end position in the counter clockwise direction. The engagement portion 6a of the trailing clamp lever 6 is stopped in a rotatable area of the bend portion 4f of the trailing drive lever 4 by a biasing force of the trailing clamp return spring 45.

On the other hand, at this time, the leading drive lever 3 has reached a cam bottom region of the leading cam 9a of the charge cam gear 9 and thereby the charge cam gear 9 does not hold the leading drive lever 3. Alternatively thereto, the engagement portion 5a of the leading clamp lever 5 engages with the bend portion 3e of the leading drive lever 3 to hold the leading drive lever 3.

Finally, the charge cam gear 9 further rotates in the clockwise direction from the state of FIGS. 20A and 20B, and thereby the photo interrupter 60 detects switching from a light-blocked state to a light-transmitted state caused by the phase plate 19. In response to this detection, the energization of the charge motor 12 is stopped and thereby the shutter reaches the movement standby state of FIGS. 5A and 5B.

At this time, the trailing drive lever 4 has reached a cam bottom region of the trailing cam 9b of the charge cam gear 9 and thereby the charge cam gear 9 does not hold the trailing drive lever 4. Alternatively thereto, the engagement portion 6a of the trailing clamp lever 6 engages with the bend portion 4f of the trailing drive lever 4 to hold the trailing drive lever 4. Thus, the charge operation is completed.

Although this embodiment described the case where the trailing curtain drive pin 4a of the trailing drive lever 4, which is the connection portion connected to the trailing curtain unit 51, contacts the first cam surface 77c and the stopper surface 77e of the lock lever 77, an alternative configuration may be employed in which a contact portion such as a pin (other than the trailing curtain drive pin 4a) provided to the trailing drive lever 4 contacts the first cam surface 77c and the stopper surface 77e of the lock lever 77. In the case of providing the lock lever in the leading curtain drive mechanism as described above, the leading curtain drive pin 3a of the leading drive lever 3, which is the connection portion connected to the leading curtain unit 50, or another contact portion may contact the lock lever.

Furthermore, although this embodiment described the case of using, as the lock member, the lock lever 77 that rotates between the lock and unlock positions, the lock member is not limited to such a rotatable member and is only necessary to be movable between lock and unlock positions.

The focal-plane shutter of the above-described embodiment enables reducing the bounce of the blade drive member (trailing drive lever 4) more surely as compared with conventional ones and stably without depending on an operation of another blade drive member. Moreover, the focal-plane shutter of the above-described embodiment enables, after the completion of the blade movement (the movement of the trailing curtain unit 51), causing the blade drive member to smoothly return to the position corresponding to before the start of the blade movement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-079956, filed on Apr. 9, 2015, which is hereby incorporated by reference herein in its entirety.

What is claimed is:

1. A focal-plane shutter comprising:
   a base plate in which an aperture is formed;
   a blade movable with respect to the base plate so as to shut or open the aperture;
   a blade drive member connected to the blade and moving with respect to the base plate to move the blade;
   an acceleration member moving with respect to the base plate in contact with the blade drive member in part of a movable range of the blade to provide a driving force to the blade drive member;
   a lock member including a stopper portion that contacts a contact portion of the blade drive member after completion of a movement of the blade to reduce bounce of the blade drive member, the lock member being movable between (a) a first position where the stopper portion enters a movable area of the contact portion with a movement of the blade drive member and thereby the stopper portion is contactable with the contact portion and (b) a second position where the stopper portion is located outside the movable area of the contact portion; and
   a biasing member biasing the lock member from the second position toward the first position,
   wherein:
   during the movement of the blade, the contact portion pushes the lock member and thereby the lock member is moved from the first position to the second position;
   before the completion of the movement of the blade, the contact portion is away from the lock member and thereby the lock member is moved from the second position to the first position; and
   after the completion of the movement of the blade, the acceleration member pushes the lock member and thereby the lock member is moved from the first position to the second position.

2. A focal-plane shutter according to claim 1, wherein:
   the lock member includes a first cam portion and a second cam portion,
   during the movement of the blade, the contact portion contacts the first cam portion to push the lock member and thereby the lock member is moved from the first position to the second position;
   before the completion of the movement of the blade, the contact portion is away from the first cam portion and thereby the lock member is moved from the second position to the first position; and after the completion of the movement of the blade, the acceleration member contacts the second cam portion to push the lock member and thereby the lock member is moved from the first position to the second position.

3. A focal-plane shutter according to claim 1, wherein the contact portion of the blade drive member is a connection portion connected to the blade.

4. A focal-plane shutter according to claim 1, wherein, when the lock member is located at the first position, the stopper portion contacts the contact portion and thereby a force toward a direction opposite to the second position acts on the lock member.

5. A focal-plane shutter according to claim 4, wherein:
the lock member is rotatable between the first and second positions; and
when the lock member is located at the first position, the stopper portion contacts the contact portion at a position located on an opposite side to the second position across a straight line connecting between a rotation center of the lock member and a center of the contact portion at the completion of the movement of the blade.

6. A focal-plane shutter according to claim 4, wherein, during the movement of the blade, the lock member and the contact portion contact each other at a contact angle of 90° or less.

7. A focal-plane shutter according to claim 1, further comprising a brake mechanism configured to be pushed by the blade drive member before the completion of the movement of the blade to provide a braking force to the blade drive member.

8. A focal-plane shutter according to claim 1, wherein, after the completion of the movement of the blade, the acceleration member moves the lock member from the first position to the second position before the blade drive member moves toward a position corresponding to before the movement of the blade.

9. An image capturing apparatus comprising:
a focal-plane shutter; and
an image sensor whose exposure is controlled by the focal-plane shutter,
wherein the focal-plane shutter comprises:
a base plate in which an aperture is formed;
a blade movable with respect to the base plate so as to shut or open the aperture;
a blade drive member connected to the blade and moving with respect to the base plate to move the blade;
an acceleration member moving with respect to the base plate in contact with the blade drive member in part of a movable range of the blade to provide a driving force to the blade drive member;
a lock member including a stopper portion that contacts a contact portion of the blade drive member after completion of a movement of the blade to reduce bounce of the blade drive member, the lock member being movable between (a) a first position where the stopper portion enters a movable area of the contact portion with a movement of the blade drive member and thereby the stopper portion is contactable with the contact portion and (b) a second position where the stopper portion is located outside the movable area of the contact portion; and
a biasing member biasing the lock member from the second position toward the first position,
wherein:
during the movement of the blade, the contact portion pushes the lock member and thereby the lock member is moved from the first position to the second position;
before the completion of the movement of the blade, the contact portion is away from the lock member and thereby the lock member is moved from the second position to the first position; and
after the completion of the movement of the blade, the acceleration member pushes the lock member and thereby the lock member is moved from the first position to the second position.

* * * * *